United States Patent
Karkow et al.

(10) Patent No.: US 9,797,595 B2
(45) Date of Patent: Oct. 24, 2017

(54) FUEL COMBUSTION SYSTEM WITH A PERFORATED REACTION HOLDER

(71) Applicant: ClearSign Combustion Corporation, Seattle, WA (US)

(72) Inventors: Douglas W. Karkow, Des Moines, WA (US); Robert E. Breidenthal, Seattle, WA (US); Joseph Colannino, Bellevue, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 142 days.

(21) Appl. No.: 14/762,155

(22) PCT Filed: Feb. 14, 2014

(86) PCT No.: PCT/US2014/016632
§ 371 (c)(1),
(2) Date: Jul. 20, 2015

(87) PCT Pub. No.: WO2014/127311
PCT Pub. Date: Aug. 21, 2014

(65) Prior Publication Data
US 2015/0316261 A1    Nov. 5, 2015

Related U.S. Application Data

(60) Provisional application No. 61/765,022, filed on Feb. 14, 2013, provisional application No. 61/931,407, filed on Jan. 24, 2014.

(51) Int. Cl.
*F23D 14/14* (2006.01)
*F23C 99/00* (2006.01)
(Continued)

(52) U.S. Cl.
CPC ............ *F23C 99/001* (2013.01); *F23C 6/042* (2013.01); *F23C 9/06* (2013.01); *F23D 11/02* (2013.01);
(Continued)

(58) Field of Classification Search
CPC ....................................................... F23D 14/16
(Continued)

(56) References Cited

U.S. PATENT DOCUMENTS 2,095,065 A    10/1937  Hays
2,604,936 A    7/1952   Kaehni et al.
(Continued)

FOREIGN PATENT DOCUMENTS

EP    0844434      5/1998
JP    60-073242    4/1985
(Continued)

OTHER PUBLICATIONS

Kim, S.G. et al., "Flame behavior in heated porous sand bed," Proceedings of the Combustion Institute 31, Jan. 2007, pp. 2117-2124.
(Continued)

*Primary Examiner* — Avinash Savani
(74) *Attorney, Agent, or Firm* — Christopher A. Wiklof; Nicholas S. Bromer; Launchpad IP, Inc.

(57) ABSTRACT

A combustion system such as a furnace or boiler includes a perforated reaction holder configured to hold a combustion reaction that produces very low oxides of nitrogen (NOx).

54 Claims, 20 Drawing Sheets

(51) Int. Cl.

| | | |
|---|---|---|
| *F23N 5/26* | (2006.01) | |
| *F27D 11/06* | (2006.01) | |
| *F23D 14/24* | (2006.01) | |
| *F23D 14/84* | (2006.01) | |
| *F23N 5/00* | (2006.01) | |
| *F23N 1/00* | (2006.01) | |
| *F23D 14/02* | (2006.01) | |
| *F23D 14/74* | (2006.01) | |
| *F23D 11/44* | (2006.01) | |
| *F23D 11/02* | (2006.01) | |
| *F23D 11/38* | (2006.01) | |
| *F23D 11/40* | (2006.01) | |
| *F23L 7/00* | (2006.01) | |
| *F23C 6/04* | (2006.01) | |
| *F23C 9/06* | (2006.01) | |
| *F23D 14/26* | (2006.01) | |
| *F23N 1/02* | (2006.01) | |
| *F23D 11/42* | (2006.01) | |

(52) U.S. Cl.
CPC ............ *F23D 11/38* (2013.01); *F23D 11/383* (2013.01); *F23D 11/406* (2013.01); *F23D 11/42* (2013.01); *F23D 11/446* (2013.01); *F23D 11/448* (2013.01); *F23D 14/02* (2013.01); *F23D 14/14* (2013.01); *F23D 14/145* (2013.01); *F23D 14/24* (2013.01); *F23D 14/26* (2013.01); *F23D 14/74* (2013.01); *F23D 14/84* (2013.01); *F23L 7/007* (2013.01); *F23N 1/00* (2013.01); *F23N 1/002* (2013.01); *F23N 1/02* (2013.01); *F23N 5/00* (2013.01); *F23N 5/265* (2013.01); *F27D 11/06* (2013.01); *F23C 2201/00* (2013.01); *F23C 2900/00* (2013.01); *F23D 2203/102* (2013.01); *F23D 2203/104* (2013.01); *F23D 2203/105* (2013.01); *F23D 2203/1023* (2013.01); *F23D 2207/00* (2013.01); *F23N 2021/00* (2013.01); *F23N 2027/22* (2013.01); *F23N 2900/00* (2013.01); *Y02T 50/677* (2013.01)

(58) Field of Classification Search
USPC .......................................... 431/18, 328, 329
See application file for complete search history.

(56) References Cited

U.S. PATENT DOCUMENTS

| | | | |
|---|---|---|---|
| 2,828,813 A | 4/1958 | Holden | |
| 3,008,513 A | 11/1961 | Holden | |
| 3,076,605 A | 2/1963 | Holden | |
| 3,228,614 A | 1/1966 | Bauer | |
| 3,324,924 A | 6/1967 | Hailstone et al. | |
| 3,416,870 A | 12/1968 | Wright | |
| 4,021,188 A | 5/1977 | Yamagishi et al. | |
| 4,081,958 A | 4/1978 | Schelp | |
| 4,408,461 A | 10/1983 | Bruhwiler et al. | |
| 4,588,373 A | 5/1986 | Tonon et al. | |
| 4,643,667 A | 2/1987 | Fleming | |
| 4,673,349 A | 6/1987 | Abe et al. | |
| 4,752,213 A | 6/1988 | Grochowski et al. | |
| 4,850,862 A * | 7/1989 | Bjerklie .................. | F23D 14/16 431/115 |
| 4,899,696 A | 2/1990 | Kennedy et al. | |
| 4,919,609 A | 4/1990 | Sarkisian et al. | |
| 5,235,667 A | 8/1993 | Canfield et al. | |
| 5,326,257 A | 7/1994 | Taylor et al. | |
| 5,380,192 A * | 1/1995 | Hamos .................... | F23D 14/02 431/328 |
| 5,431,557 A * | 7/1995 | Hamos .................... | F23D 14/02 431/328 |
| 5,441,402 A | 8/1995 | Reuther et al. | |
| 5,511,516 A | 4/1996 | Moore, Jr. et al. | |
| 5,667,374 A | 9/1997 | Nutcher et al. | |
| 5,718,573 A | 2/1998 | Knight et al. | |
| 5,890,886 A | 4/1999 | Doker et al. | |
| 5,899,686 A | 5/1999 | Carbone et al. | |
| 6,159,001 A | 12/2000 | Kushch et al. | |
| 6,997,701 B2 | 2/2006 | Volkert et al. | |
| 7,137,808 B2 | 11/2006 | Branston et al. | |
| 7,243,496 B2 | 7/2007 | Pavlik et al. | |
| 7,360,506 B2 | 4/2008 | Shellenberger et al. | |
| 7,523,603 B2 | 4/2009 | Hagen et al. | |
| 7,666,367 B1 | 2/2010 | Durst et al. | |
| 8,851,882 B2 | 10/2014 | Hartwick et al. | |
| 9,377,190 B2 | 6/2016 | Karkow et al. | |
| 9,388,981 B2 | 7/2016 | Karkow et al. | |
| 9,447,965 B2 | 9/2016 | Karkow et al. | |
| 2002/0155403 A1 | 10/2002 | Griffin et al. | |
| 2003/0138629 A1 | 7/2003 | Dewaegheneire | |
| 2004/0081933 A1 | 4/2004 | St. Charles et al. | |
| 2005/0208442 A1 | 9/2005 | Heiligers et al. | |
| 2006/0008755 A1 | 1/2006 | Leinemann et al. | |
| 2006/0035190 A1 | 2/2006 | Hoetger et al. | |
| 2008/0268387 A1 | 10/2008 | Saito et al. | |
| 2009/0056923 A1 | 3/2009 | Lin | |
| 2010/0077731 A1* | 4/2010 | Jeong .................... | F01N 3/0256 60/286 |
| 2010/0178219 A1 | 7/2010 | Verykios et al. | |
| 2011/0044868 A1 | 2/2011 | Lee et al. | |
| 2011/0076628 A1 | 3/2011 | Miura et al. | |
| 2011/0203771 A1 | 8/2011 | Goodson et al. | |
| 2013/0004902 A1 | 1/2013 | Goodson et al. | |
| 2015/0118629 A1 | 4/2015 | Colannino et al. | |
| 2015/0276217 A1 | 10/2015 | Karkow et al. | |
| 2015/0285491 A1 | 10/2015 | Karkow et al. | |
| 2015/0330625 A1 | 11/2015 | Karkow et al. | |
| 2015/0362178 A1 | 12/2015 | Karkow et al. | |
| 2015/0369477 A1 | 12/2015 | Karkow et al. | |
| 2016/0018103 A1 | 1/2016 | Karkow et al. | |
| 2016/0025333 A1 | 1/2016 | Karkow et al. | |
| 2016/0091200 A1 | 3/2016 | Colannino et al. | |
| 2016/0230984 A1 | 8/2016 | Colannino et al. | |

FOREIGN PATENT DOCUMENTS

| | | |
|---|---|---|
| JP | WO 2004/042280 | 5/2004 |
| JP | 2006-275482 | 10/2006 |
| WO | WO 95/00803 | 1/1995 |
| WO | WO 2015/042615 | 3/2015 |
| WO | WO 2015/054323 | 4/2015 |
| WO | WO 2015/061760 | 4/2015 |
| WO | WO 2015/070188 | 5/2015 |
| WO | WO 2015/112950 | 7/2015 |

OTHER PUBLICATIONS

M. Abdul Mujeebu et al., "Applications of Porous Media Combustion Technology—A Review." Applied Energy 86, 2009, pp. 1365-1375.
Takeno, Abstract, Combustion Institute 1982, 1 page.
Arnold Schwarzenegger, A Low NOx Porous Ceramics Burner Performance Study, California Energy Commission Public Interest Energy Research Program, Dec. 2007, 1-43, San Diego State University Foundation.
J.R. Howell et al, Combustion of Hydrocarbon Fuels Within Porous Inert Media, Prog. Energy Combust, 1996, pp. 121-145, vol. 22, Elsevier Science Ltd, Great Britain.
PCT International Search Report and Written Opinion of International PCT Application No. PCT/US2014/016632 dated Feb. 14, 2014.
Fric , Thomas F., "Effects of Fuel-Air Unmixedness on NOx Emissions," Sep.-Oct. 1993. Journal of Propulsion and Power, vol. 9, No. 5, pp. 708-713.
EPO Extended Search Report and Search Opinion of EP Application No. 14751185.1 dated Feb. 21, 2017.

\* cited by examiner

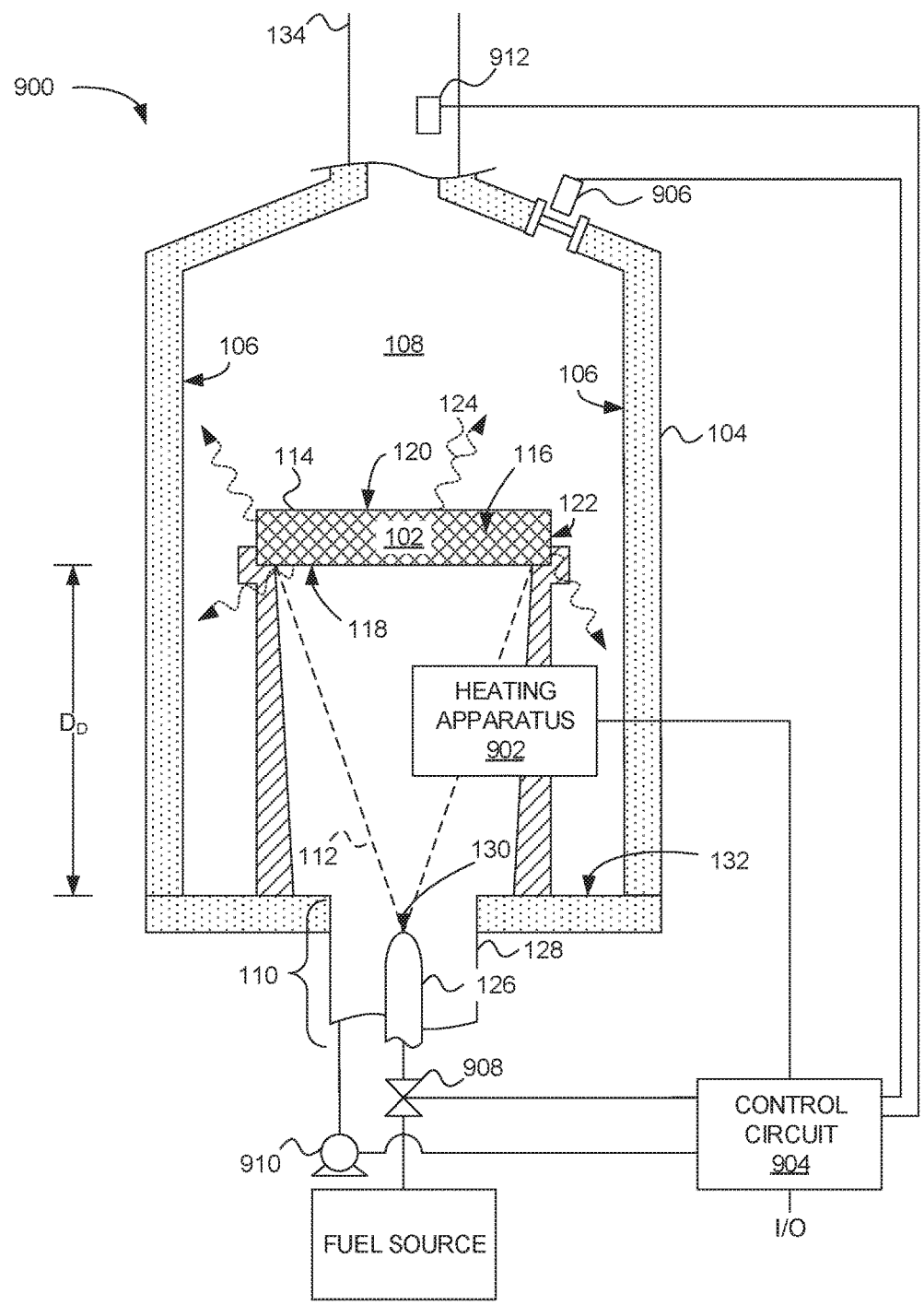

FUEL COMBUSTION SYSTEM WITH A PERFORATED REACTION HOLDER

CROSS-REFERENCE TO RELATED APPLICATIONS

The present application is a U.S. National Phase application under 35 U.S.C. 371 of International Patent Application No. PCT/US2014/016632, entitled "FUEL COMBUSTION SYSTEM WITH A PERFORATED REACTION HOLDER," filed Feb. 14, 2014; which application claims the benefit of U.S. Provisional Patent Application No. 61/765,022, entitled "PERFORATED FLAME HOLDER AND BURNER INCLUDING A PERFORATED FLAME HOLDER," filed Feb. 14, 2013, and U.S. Provisional Patent Application No. 61/931,407, entitled "LOW NOx FIRE TUBE BOILER," filed Jan. 24, 2014; each of which, to the extent not inconsistent with the disclosure herein, is incorporated herein by reference.

The present application is related to International Patent Application No. PCT/US2014/016628, entitled "PERFORATED FLAME HOLDER AND BURNER INCLUDING A PERFORATED FLAME HOLDER," filed Feb. 14, 2014; International Patent Application No. PCT/US2014/016622, entitled "STARTUP METHOD AND MECHANISM FOR A BURNER HAVING A PERFORATED FLAME HOLDER," filed Feb. 14, 2014; and International Patent Application No. PCT/US2014/016626, entitled "SELECTABLE DILUTION LOW NOx BURNER," filed Feb. 14, 2014; each of which, to the extent not inconsistent with the disclosure herein, is incorporated herein by reference.

BACKGROUND

Industrial and commercial burners are used across a broad range of applications, including process heat sources, flame treatment systems, steam boilers for electrical power generation, and hot gas sources for gas turbines. Collectively, industrial and commercial burners are a significant source of air pollution. Notwithstanding pollutants released by fuel, flames produced by even "clean-burning" fuels such as hydrogen, hydrocarbon gases, and pure hydrocarbon liquids produce pollutants such as oxides of nitrogen (collectively referred to as "NOx" herein). Hydrocarbon fuels can further release carbon monoxide (CO), and fuel slip into the atmosphere.

In a conventional combustion system typical of industrial and commercial burners, the combustion reaction is relatively uncontrolled. That is, a flame can vary in conformation such that its shape and location at any particular point in time is unpredictable. This unpredictability, combined with high peak temperatures encountered especially at the stoichiometric interface (the visible surface) in a diffusion flame can cause operational problems such as coking of reaction tubes and/or uneven heating of steam tubes. Moreover, the length of a conventional flame causes a relatively long residence time during which combustion air (including molecular nitrogen) is subject to high temperature.

What is needed is a technology for reducing pollutants released by combustion systems such as industrial and commercial burners. What is also needed is a technology that can improve flame control in such systems.

SUMMARY

According to an embodiment, a burner system includes a fuel and oxidant source disposed to output fuel and oxidant into a combustion volume to form a fuel and oxidant mixture. A perforated reaction holder is disposed in the combustion volume, the perforated reaction holder including a perforated reaction holder body defining a plurality of perforations aligned to receive the fuel and oxidant mixture from the fuel and oxidant source. The perforations are configured to collectively hold a combustion reaction supported by the fuel and oxidant mixture.

According to an embodiment, a furnace includes a fuel and air source disposed to output fuel and air into a combustion volume to form a fuel and air mixture. A perforated reaction holder is disposed in the combustion volume. The perforated reaction holder includes a perforated reaction holder body defining a plurality of perforations aligned to receive the fuel and air mixture from the fuel and air source. A perforated reaction holder support structure is configured to support the perforated reaction holder at a distance from the fuel and air source. The perforations can be configured to collectively hold a major portion of a combustion reaction supported by the fuel and air mixture.

According to an embodiment, a combustion system includes a fuel and oxidant source configured to output fuel and oxidant as a fuel and oxidant mixture and a perforated reaction holder 102 aligned to receive the fuel and oxidant mixture across an input surface 118 including a plurality of perforations 116. A heating apparatus is configured to cause heating of the perforated reaction holder. The perforated reaction holder is configured to support a combustion reaction supported by the fuel and oxidant mixture n the plurality of perforations after the heating apparatus preheats the perforated reaction holder 102.

According to an embodiment, a combustion system includes a premix fuel and oxidant source configured to output a premixed stream of fuel and air into a combustion volume. A perforated reaction holder includes an input surface aligned to receive the premixed stream of fuel and air. The perforated reaction holder includes a plurality of perforations having openings distributed across the input surface, the plurality of perforations being collectively configured to support a combustion reaction.

BRIEF DESCRIPTION OF THE DRAWINGS

FIG. 9A is diagram of a combustion system including a perforated reaction holder, according to an embodiment.

DETAILED DESCRIPTION

Figure 1A:
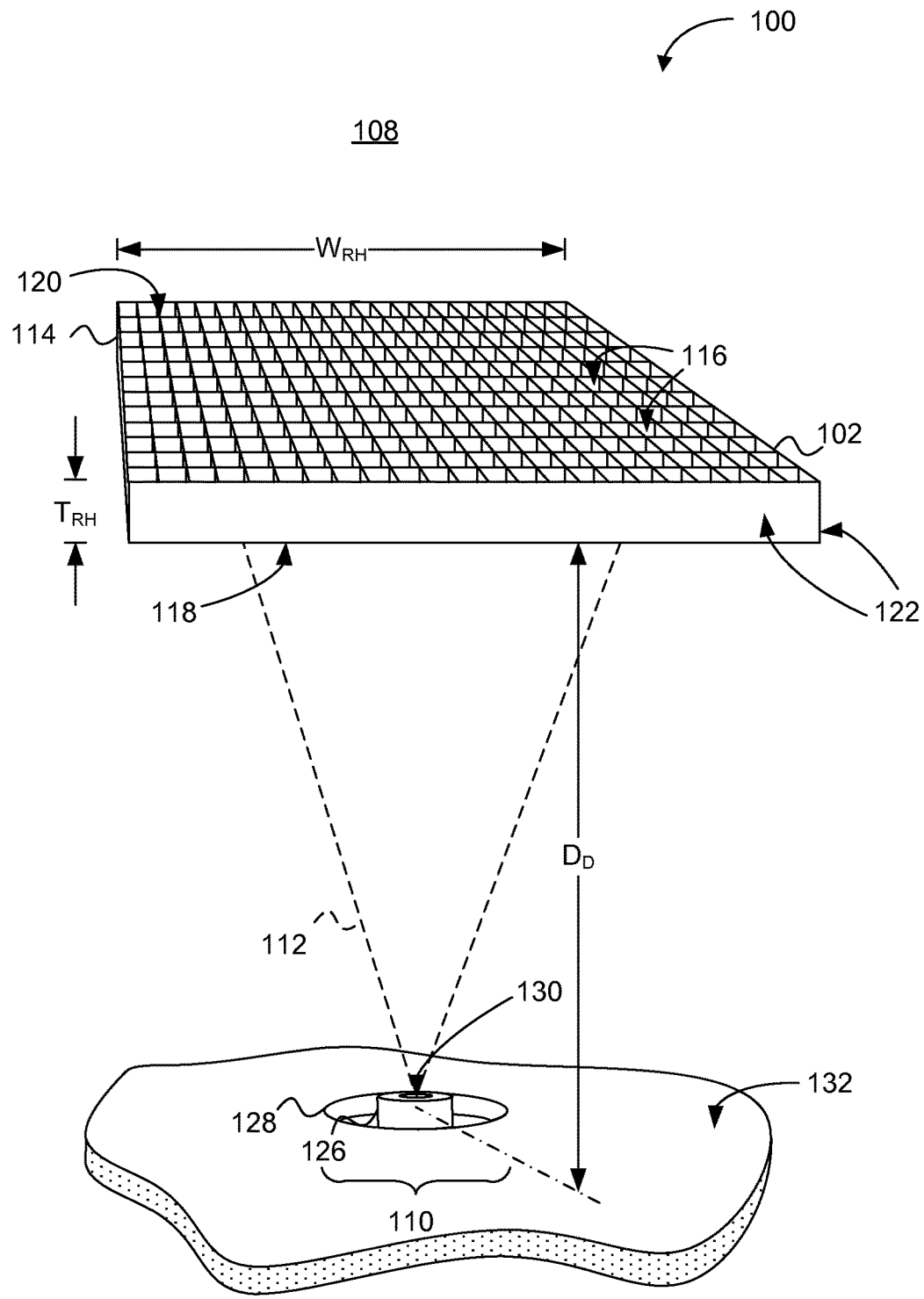
FIG. 1A is a simplified perspective view of a burner system including a perforated reaction holder, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

The inventors recognize that to minimize output of oxides of nitrogen (NOx) it is desirable to 1) minimize the peak flame temperature, and 2) minimize residence time at the peak flame temperature. Heretofore, technologies to minimize flame temperature have been unavailable or expensive and complex. Technologies to minimize residence time have similarly been unavailable or expensive and complex.

According to embodiments described and claimed herein, a burner system 100 is equipped with a perforated reaction holder configured to support lean combustion that both minimizes peak flame temperature and reduces residence time at the flame temperature. Experiments have yielded NOx concentration in low single digit parts per million in a pilot scale apparatuses.

Figure 1B:
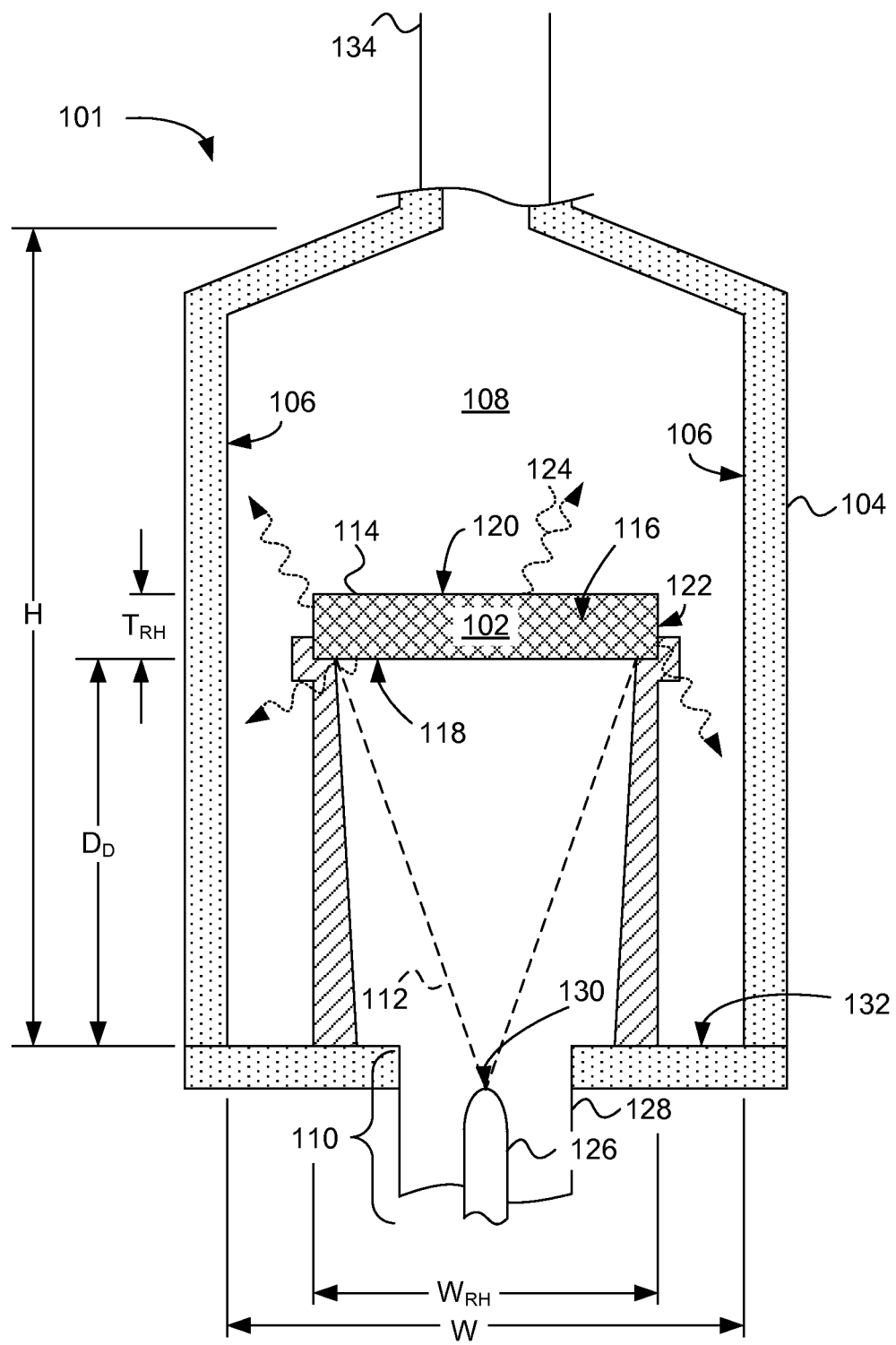
FIG. 1B is a simplified side sectional view of the burner system of FIG. 1A, according to an embodiment.

FIG. 1A is a simplified perspective view of a burner system 100 including a perforated reaction holder 102, according to an embodiment. FIG. 1B is a simplified side sectional view of the combustion system 101 of FIG. 1A, according to an embodiment. Referring to FIGS. 1A and 1B, the burner system 100 includes a fuel and oxidant source 110 disposed to output fuel and oxidant into a combustion volume 108 to form a fuel and oxidant mixture 112. A perforated reaction holder 102 is disposed in the combustion volume 108. The perforated reaction holder 102 includes a perforated reaction holder body 114 defining a plurality of perforations 116 aligned to receive the fuel and oxidant mixture 112 from the fuel and oxidant source 110. The perforations 116 are configured to collectively hold a combustion reaction (e.g., see FIG. 2, 208) supported by the fuel and oxidant mixture 112.

The fuel can include a hydrocarbon gas or a vaporized hydrocarbon liquid, for example. The fuel can be a single species or can include a mixture of gases and vapors. For example in a process heater application, the fuel can include fuel gas or byproducts from the process that include carbon monoxide (CO), hydrogen ($H_2$), and methane ($CH_4$). In another application the fuel can include natural gas (mostly $CH_4$) or propane. In another application, the fuel can include #2 fuel oil or #6 fuel oil. Dual fuel applications and flexible fuel applications are similarly contemplated by the inventors. The oxidant can include oxygen carried by air and/or can include another oxidant, either pure or carried by a carrier gas.

Generally, the oxidation reaction held by the perforated reaction holder is indicative of a gas phase oxidation reaction. Other reactants and reactions may be substituted without departing from the spirit and scope of the disclosure.

According to an embodiment, the perforated reaction holder body 114 can be bounded by an input surface 118 disposed to receive the fuel and oxidant mixture 112, an output surface 120 facing away from the fuel and oxidant source 110, and a peripheral surface 122 defining a lateral extent of the perforated reaction holder 102. The plurality of perforations 116 defined by the perforated reaction holder body 114 extend from the input surface 118 to the output surface 120.

According to an embodiment, the perforated reaction holder 102 is configured to hold a majority of the combustion reaction within the perforations 116. For example, this means that more than half the molecules of fuel output into the combustion volume 108 by the fuel and oxidant source 110 are converted to combustion products between the input surface 118 and the output surface 120 of the perforated reaction holder 102. According to an alternative interpretation, this means that more than half of the heat output by the combustion reaction is output between the input surface 118 and the output surface 120 of the perforated reaction holder 102. Under nominal operating conditions, the perforations 116 can be configured to collectively hold at least 80% of the combustion reaction 208 between the input surface 118 and the output surface 120 of the perforated reaction holder 102. In some experiments, the inventors produced a combustion reaction that was wholly contained in the perforations between the input surface 118 and the output surface 120 of the perforated reaction holder 102.

Figure 7A:
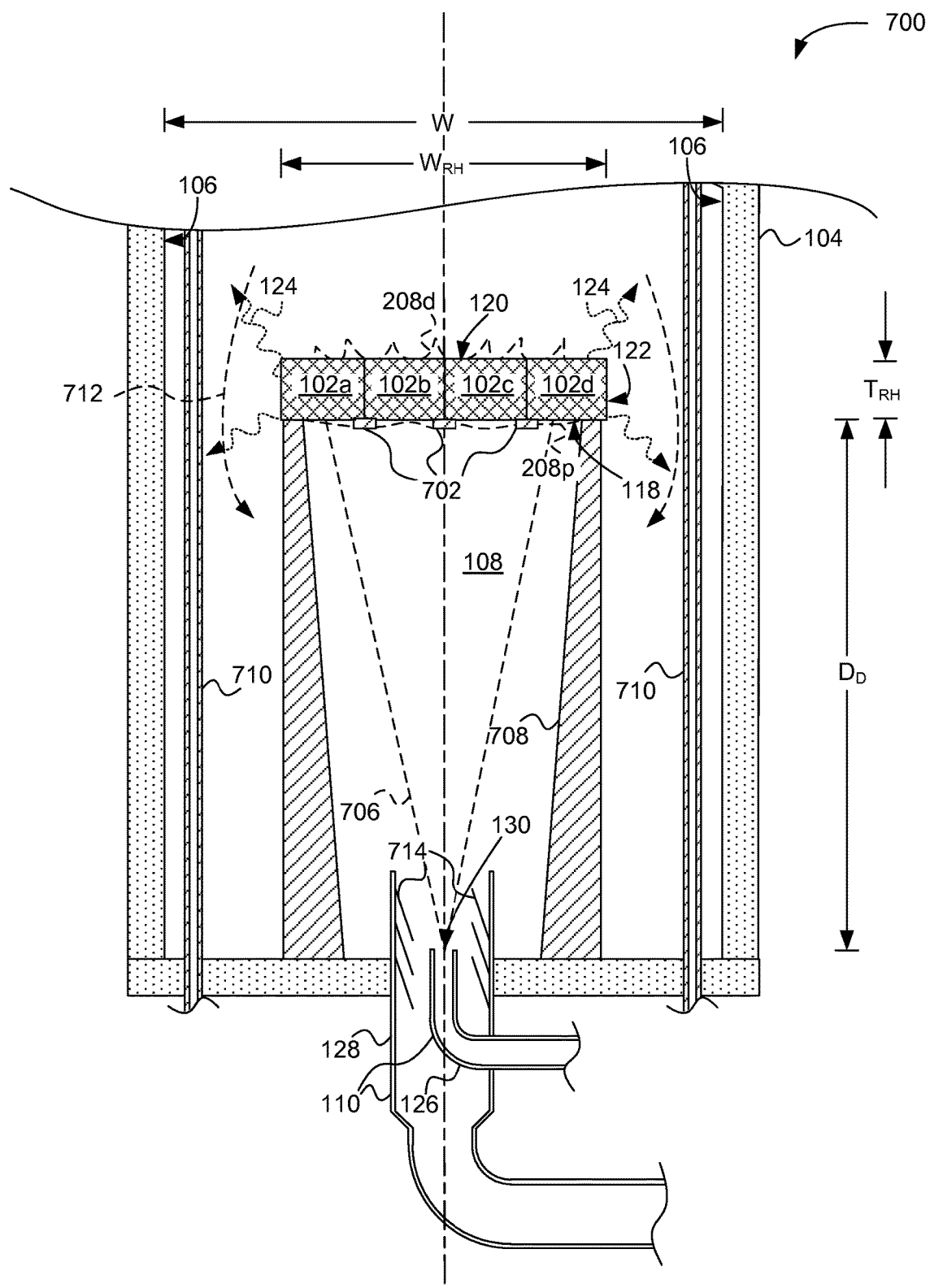
FIG. 7A is a simplified side sectional view of a furnace including a perforated reaction holder, according to an embodiment.

The perforated reaction holder 102 can be configured to receive heat from the combustion reaction and output a portion of the received heat as thermal radiation 124 to heat-receiving structures (e.g., furnace walls 106 and/or radiant section working fluid tubes (see. FIG. 7A, 710)) in or adjacent to the combustion volume 108. The perforated reaction holder outputs another portion of the received heat to the fuel and oxidant mixture 112 received at the input surface 118 of the perforated reaction holder 102.

In this way, the perforated reaction holder 102 acts as a heat source to maintain the combustion reaction, even under conditions where a combustion reaction would not be stable when supported from a conventional flame holder. This capability can be leveraged to support combustion using a leaner fuel to oxidant mixture than was previously feasible.

Leaner combustion results in lower peak combustion temperature and reduces oxides of nitrogen (NOx) output. Moreover, the perforated reaction holder 102 may act as a heat sink to cool hotter parts of the reaction to further minimize combustion temperature. Finally, substantial containment of the combustion reaction between the input surface 118 and the output surface 120 of the perforated reaction holder 102 limits the time during which the combustion fluid (including molecular nitrogen, $N_2$, if the oxidant includes oxygen carried by air) is exposed to high temperature. The inventors believe this further limits NOx output.

Cooled flue gas is vented to the atmosphere through an exhaust flue 134. Optionally, the vented flue gas can pass through an economizer that pre-heats the combustion air, the fuel, and/or feed water.

The perforated reaction holder 102 can have a width dimension $W_{RH}$ between opposite sides of the peripheral surface 122 at least twice a thickness dimension $T_{RH}$ between the input surface 118 and the output surface 120. In another embodiment, the perforated reaction holder 102 can have a width dimension $W_{RH}$ between opposite sides of the peripheral surface 122 at least three times a thickness dimension $T_{RH}$ between the input surface 118 and the output surface 120. In another embodiment, the perforated reaction holder 102 has a width dimension $W_{RH}$ between opposite sides of the peripheral surface 122 at least six times a thickness dimension $T_{RH}$ between the input surface 118 and the output surface 120. In another embodiment, the perforated reaction holder 102 has a width dimension $W_{RH}$ between opposite sides of the peripheral surface 122 at least nine times a thickness dimension $T_{RH}$ between the input surface 118 and the output surface 120.

In an embodiment, the perforated reaction holder 102 can have a width dimension $W_{RH}$ less than a width W of the combustion volume 108. This can allow circulation of flue gas from above to below the perforated reaction holder 102.

The perforated reaction holder 102 can be formed from a refractory material. In another embodiment, the perforated reaction holder 102 can be formed from an aluminum silicate material. In another embodiment, the perforated reaction holder 102 can be formed from mullite or cordierite.

The fuel and oxidant source 110 can further include a fuel nozzle 126 configured to output fuel and an oxidant source 128 configured to output a fluid including the oxidant. The fuel nozzle 126 can be configured to output pure fuel. The oxidant source 128 can be configured to output the fluid including the oxidant that includes no fuel. For example, the oxidant source 128 can be configured to output air carrying oxygen.

The fuel nozzle 126 can be configured to emit a fuel jet selected to entrain the oxidant to form the fuel and oxidant mixture 112 as the fuel jet and oxidant travel through a dilution distance $D_D$ between the fuel nozzle 126 and the perforated reaction holder 102. Additionally or alternatively, the fuel nozzle 126 can be configured to emit a fuel jet selected to entrain the oxidant and to entrain flue gas as the fuel jet travels through a dilution distance $D_D$ between the fuel nozzle 126 and an input surface 118 of the perforated reaction holder 102.

The perforated reaction holder 102 can be disposed a distance $D_D$ away from the fuel nozzle. The fuel nozzle 126 can be configured to emit the fuel through a fuel orifice 130 having a dimension $D_O$. The perforated reaction holder 102 can be disposed to receive the fuel and oxidant mixture 112 at a distance $D_D$ away from the fuel nozzle greater than 20 times the fuel orifice 130 dimension $D_O$. In another embodiment, the perforated reaction holder 102 is disposed to receive the fuel and oxidant mixture 112 at a distance $D_D$ away from the fuel nozzle 126 greater than or equal to 100 times the fuel orifice 130 dimension $D_O$. In another embodiment the perforated reaction holder 102 can be disposed to receive the fuel and oxidant mixture 112 at a distance $D_D$ away from the fuel nozzle 126 equal to about 245 times the fuel orifice 130 dimension $D_O$.

The perforated reaction holder 102 can include a single perforated reaction holder body 114. In another embodiment, he perforated reaction holder 102 can include a plurality of adjacent perforated reaction holder sections 102a, 102b, 102c, 102d. (E.g., see the tiled perforated reaction holder 102 shown in FIG. 7.) The plurality of adjacent perforated reaction holder bodies 114 can provide a tiled perforated reaction holder 102.

The perforated reaction holder 102 can further include a perforated reaction holder tile support structure 702 configured to support the plurality of perforated reaction holder sections 102a, 102b, 102c, 102d. The perforated reaction holder tile support structure 702 can include a metal superalloy. In another embodiment, the plurality of adjacent perforated reaction holder sections 102a, 102b, 102c, 102d can be joined with a fiber reinforced refractory cement.

Figure 2A:
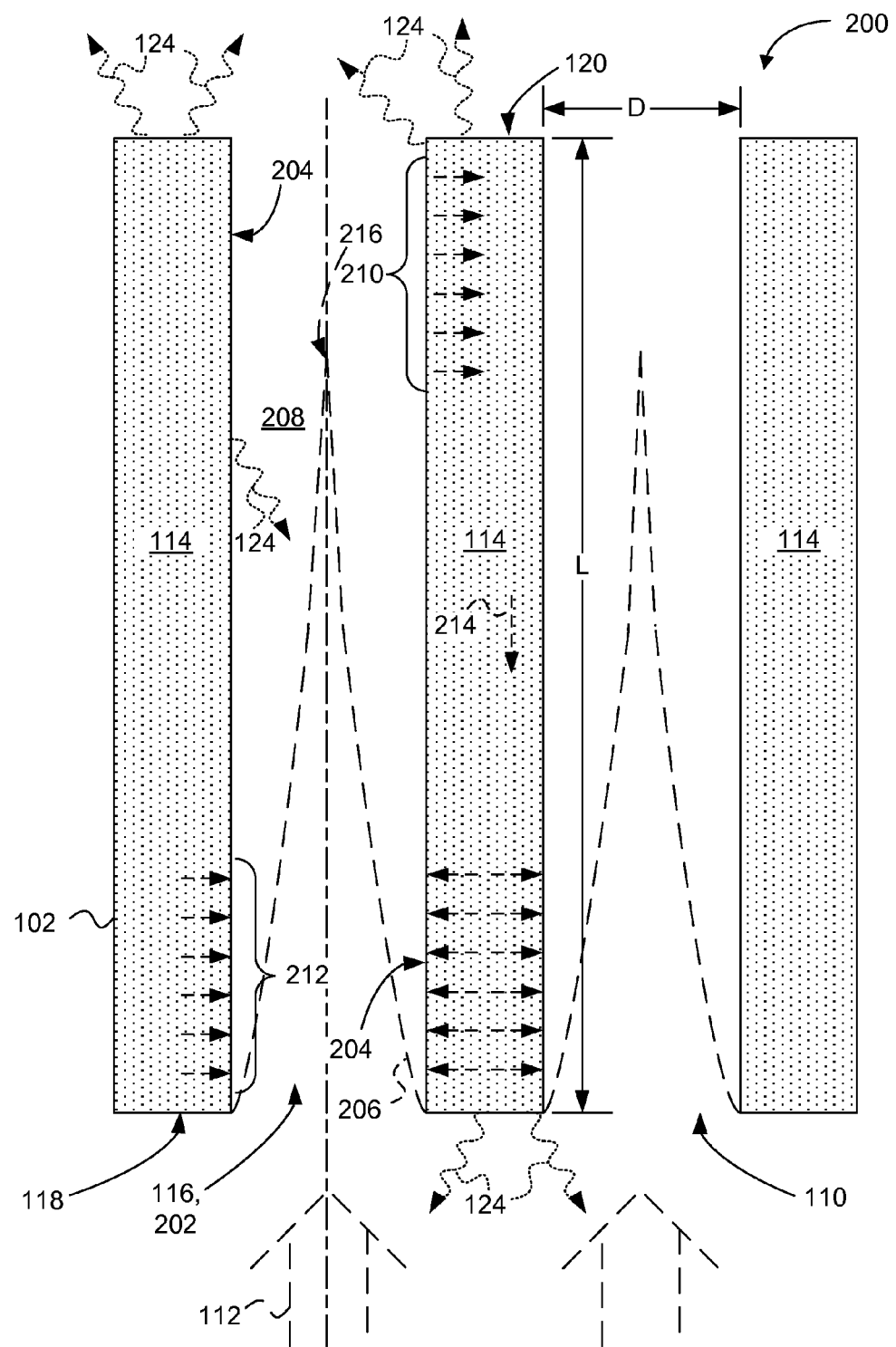
FIG. 2A is side sectional diagram of a portion of the perforated reaction holder of FIGS. 1A and 1B, according to an embodiment.
Figure 2B:
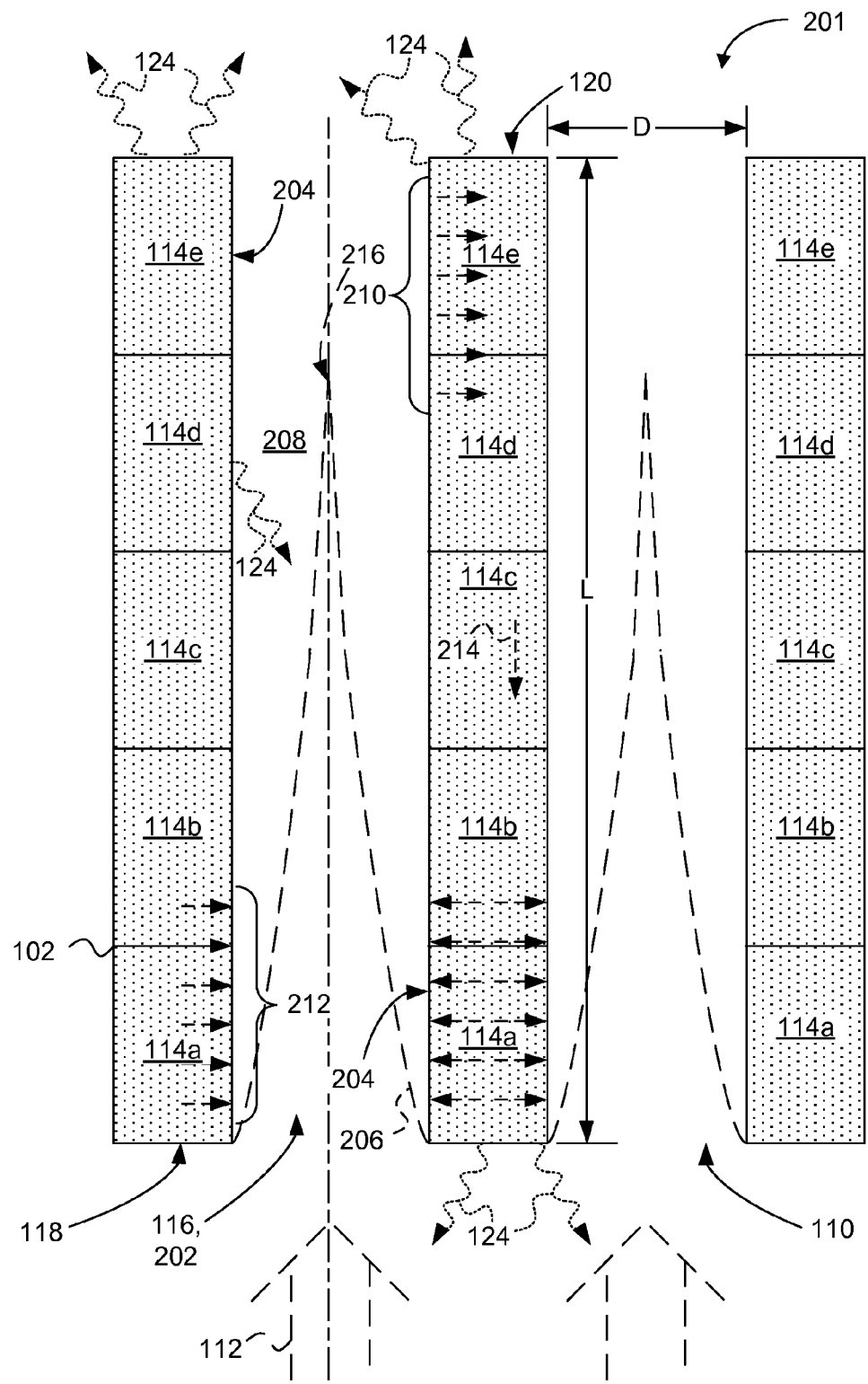
FIG. 2B is a side sectional diagram of the perforated reaction holder of FIGS. 1A and 1B, according to another embodiment.

FIG. 2A is side sectional diagram of a portion of the perforated reaction holder 200 of FIGS. 1A and 1B, according to an embodiment. FIG. 2A is side sectional diagram of a portion of the perforated reaction holder 200 of FIGS. 1A and 1B, according to another embodiment. In the embodiment 200 of FIG. 2A, the perforated reaction holder body 114 is continuous. That is, the body 124 is formed from a single piece of material. The embodiment 200 of FIG. 2A also illustrates perforations 116 that are non-branching. That is, the perforated reaction holder body 114 defines perforations 116 that are separated from one another such that no flow crosses between perforations. FIG. 2B illustrates a perforated reaction holder body 114 that is discontinuous. For example, the body 114 is formed from a plurality of pieces 114a, 114b, 114c, 114d, 114e that together form the perforated reaction holder body 114. Although the body 114a, 114b, 114c, 114d, 114e is discontinuous, it also defines perforations 116 that are non-branching in that they are separated from one another by the perforated reaction holder body 114. The perforated reaction holder body 114 of FIG. 2B can include stacked sheets of material, each sheet having openings registered to the openings of at least one of a subjacent or superjacent sheet.

A continuous perforated reaction holder body 114 refers to a single body that has perforations formed through the body 114, in contrast to a perforated reaction holder body 114 formed from a plurality of individual pieces. This is a different than the concept of singular or plural perforated reaction holder sections (see FIG. 7, 102a, 102b, 102c, 102d). The sections 102a, 102b, 102c, 102d can be formed from either continuous or discontinuous perforated reaction holder bodies 114.

Figure 2C:
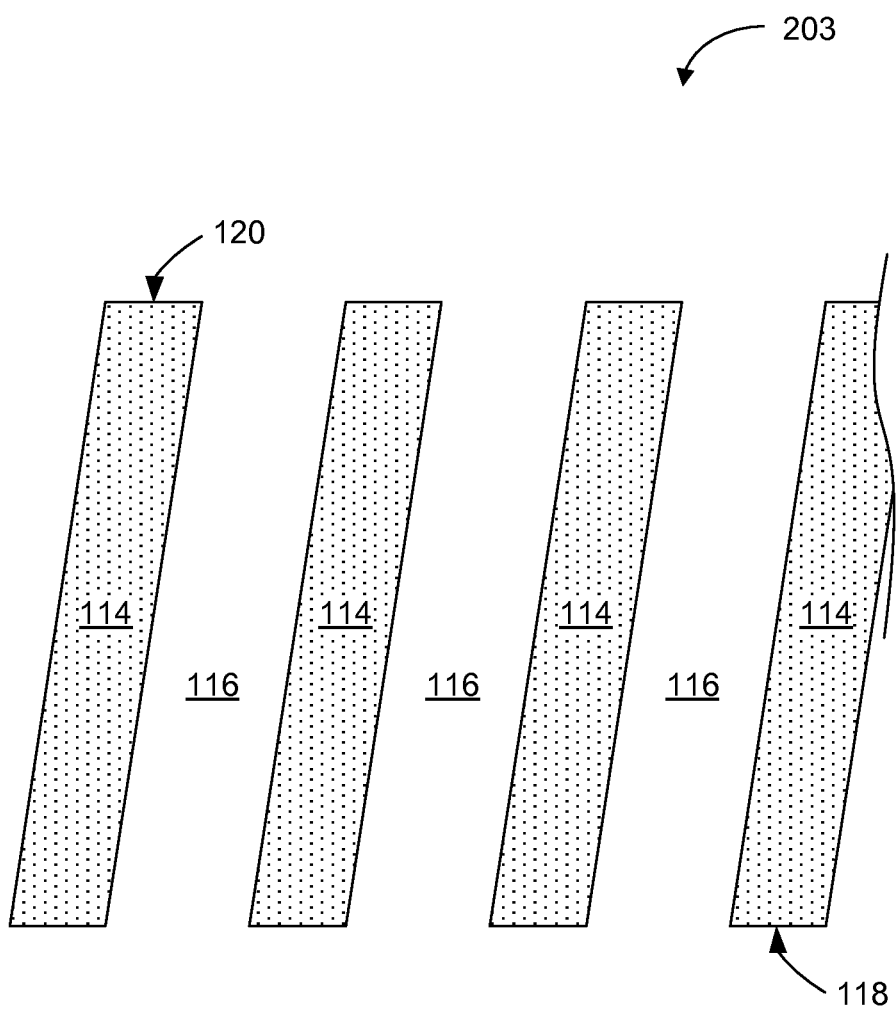
FIG. 2C is a side sectional diagram of the perforated reaction holder of FIGS. 1A and 1B, according to another embodiment.

FIG. 2C is a side sectional view of an embodiment 203 wherein the perforated reaction holder body 114 defines perforations that are non-normal to the input and output surfaces 118, 120. While this arrangement has an effect on gas trajectory exiting the output surface 120, the perforations operate similarly to those described in conjunction with FIGS. 2A and 2B.

Referring now to FIGS. 2A and 2B, the perforated reaction holder body 114 defines a plurality of perforations 116 configured to convey the fuel and oxidant and to hold the oxidation reaction 208 supported by the fuel and oxidant.

The body is configured to receive heat from the combustion reaction 208, hold the heat, and output the heat to the fuel and oxidant entering the perforations 116. The perforations 116 can maintain a combustion reaction 208 of a leaner mixture of fuel and oxidant 112 than is maintained outside of the perforations 116.

The perforated reaction holder 102 has an extent defined by an input surface 118 facing the fuel and oxidant source 110 and an output surface 120 facing away from the fuel and oxidant source 110. The perforated reaction holder body 114 defines a plurality of perforations 116 that can be formed as a plurality of elongated apertures 202 extending from the input surface 118 to the output surface 120.

The perforated reaction holder 102 receives heat from the oxidation reaction 208 and outputs sufficient heat to the fuel and oxidant mixture 112 to maintain the combustion reaction 208 in the perforations 116. The perforated reaction holder 102 can also output a portion of the received heat as thermal radiation 124 to combustor walls 106 of the combustion volume 108. Each of the perforations 116 can bound a respective finite portion of the fuel combustion reaction 208.

In an embodiment, the plurality of perforations 116 are each characterized by a length L defined as a reaction fluid propagation path length between an input surface 118 and an output surface 120 of the perforated reaction holder 102. The reaction fluid includes the fuel and oxidant mixture 112 (optionally including air, flue gas, and/or other "non-reactive" species, reaction intermediates (including transition states that characterize the combustion reaction), and reaction products.

The plurality of perforations 116 can be each characterized by a transverse dimension D between opposing perforation walls 204. The length L of each perforation 116 can be at least eight times the transverse dimension D of the perforation. In another embodiment, the length L can be at least twelve times the transverse dimension D. In another embodiment, the length L can be at least sixteen times the transverse dimension D. In another embodiment, the length L can be at least twenty-four times the transverse dimension D. The length L can be sufficiently long for thermal boundary layers 206 formed adjacent to the perforation walls 204 in a reaction fluid flowing through the perforations 116 to converge within the perforations 116, for example.

According to an embodiment, the perforated reaction holder 102 can be configured to cause the fuel combustion reaction 208 to occur within thermal boundary layers 206 formed adjacent to perforation walls 204 of the perforations 116. As relatively cool fuel and oxidant 112 approach the input surface 118, the flow is split into portions that respectively travel through individual perforations 116. The hot perforated reaction holder body 114 transfers heat to the fluid, notably within thermal boundary layer 206 that progressively thicken as more and more heat is transferred to the incoming fuel and oxidant. After reaching a combustion temperature, the reactants flow while a chemical ignition delay time elapses, after which the combustion reaction occurs. Accordingly, the combustion reaction 208 is shown as occurring within the thermal boundary layers 206. As flow progresses, the thermal boundary layers merge at a point 216. Ideally, the point 216 lies between the input surface 118 and output surface 120. At some point, the combustion reaction 208 causes the flowing gas (and plasma) to output more heat than it receives from the body 114. The received heat (from a region 210 is carried to a region nearer to the input surface 120, where the heat recycles into the cool reactants.

The perforations 116 can include elongated squares, each of the elongated squares has a transverse dimension D between opposing sides of the squares. In another embodiment, the perforations 116 can include elongated hexagons, each of the elongated hexagons has a transverse dimension D between opposing sides of the hexagons. In another embodiment, the perforations 116 can include hollow cylinders, each of the hollow cylinders has a transverse dimension D corresponding to a diameter of the cylinders. In another embodiment, the perforations 116 can include truncated cones, each of the truncated cones has a transverse dimension D that is rotationally symmetrical about a length axis that extends from the input surface 118 to the output surface 120. The perforations 116 can each have a lateral dimension D equal to or greater than a quenching distance of the fuel.

In one range of embodiments, the plurality of perforations have a lateral dimension D between 0.05 inch and 1.0 inch. Preferably, the plurality of perforations have a lateral dimension D between 0.1 inch and 0.5 inch. For example the plurality of perforations can have a lateral dimension D of about 0.2 to 0.4 inch.

The perforated reaction holder body 114 can include a refractory material. The perforated reaction holder body 114 can include a metal superalloy, for example, or the perforated reaction holder body can be formed from a refractory material such as cordierite or mullite, for example. The perforated reaction holder body 114 can define a honeycomb.

The perforations 116 can be parallel to one another and normal to the input and output surfaces 118, 120. In another embodiment, the perforations 116 can be parallel to one another and formed at an angle relative to the input and output surfaces 118, 120. In another embodiment, the perforations 116 can be non-parallel to one another. In another embodiment, the perforations 116 can be non-parallel to one another and non-intersecting.

Referring to FIG. 2C, the perforations 116 can be formed at an angle relative to an input surface and an output surface 118, 120 of the perforated reaction holder 102. In another embodiment, the perforations 116 can be respectively formed at an angle relative to the input and output surfaces 118, 120 of the perforated reaction holder 102 and can be collectively angled to produce a streamwise vortex in oxidation fluid exiting from the perforated reaction holder 102.

Referring again to FIGS. 2A and 2B, the perforated reaction holder body 114 defining the perforations 116 can be configured to receive heat from the (exothermic) combustion reaction 208 at least in second regions 210 of perforation walls 204. (e.g., near the output surface 120 of the perforated reaction holder 102). The perforated reaction holder body 114 defining the perforations 116 can be characterized by a heat capacity. The perforated reaction holder body 114 can be configured to hold heat from the combustion fuel reaction in an amount corresponding to the heat capacity.

The perforated reaction holder body 114 can be configured to transfer heat from the heat receiving regions 210 to heat output regions 212 of the perforation walls 204. (e.g., wherein the heat output regions 212 are near the input surface 118 of the perforated reaction holder 102). For example, the perforated reaction holder body 114 can be configured to transfer heat from the heat receiving regions 210 to the heat-output regions 212 of the perforation walls 204 via thermal radiation 124. Additionally or alternatively, the body 114 can be configured to transfer heat from the heat-receiving regions 210 to the heat-output regions 212 of the perforation walls 204 via a heat conduction path 214.

In another embodiment, the perforated reaction holder body 114 can be configured to transfer heat to a working fluid. The working fluid can be configured to transfer heat from a portion of the body near the heat-receiving regions 210 of the perforation walls 204 to a portion of the body near the heat-output regions 212 of the perforation walls 204.

The perforated reaction holder body 114 can be configured to output heat to the boundary layers 206 at least in heat-output regions 210 of perforation walls 204. (e.g., near the input surface 118 of the perforated reaction holder 102). Additionally or alternatively, the body 114 can be configured to output heat to the fuel and oxidant mixture 112 at least in heat-output regions 210 of perforation walls 204. (e.g., near the input surface 118 of the perforated reaction holder 102). wherein the perforated reaction holder body 114 is configured to convey heat between adjacent perforations 116. The heat conveyed between adjacent perforations can be selected to cause heat output from the combustion reaction portion 208 in a perforation to supply heat to stabilize a combustion reaction portion 208 in an adjacent perforation 116.

The perforated reaction holder body 114 can be configured to receive heat from the fuel combustion reaction 208 and output thermal radiated heat energy 124 to maintain a temperature of the perforated reaction holder body 114 below an adiabatic flame temperature of the fuel combustion reaction 208. Additionally or alternatively, the body can be configured to receive heat from the fuel combustion reaction 208 to cool the fuel combustion reaction 208 to a temperature below a NOx formation temperature.

The plurality of perforations 116 can include a plurality of elongated squares. In another embodiment, the plurality of perforations 116 can include a plurality of elongated hexagons.

Honeycomb shapes used in the perforated reaction holder 102 can be formed from VERSAGRID® ceramic honeycomb, available from Applied Ceramics, Inc. of Doraville, S.C.

As described above, FIG. 2A illustrates an embodiment 200 wherein the perforated reaction holder body 114 is continuous. A continuous reaction holder body 114 is, within any one section, a single piece that is extruded, drilled, or otherwise formed to define the plurality of perforations 116. FIG. 2B illustrates an embodiment 201 wherein the perforated reaction holder body 114 is discontinuous. A discontinuous reaction holder body 114 is formed from a plurality of pieces of material. In the embodiment 201, the plurality of pieces of material comprise planar pieces 114a, 114b, 114c, 114d that are stacked to form the reaction holder body. The embodiments 200 and 201 operate substantially identically in that the individual stacked pieces 114a, 114b, 114c, 114d are intimately contacting and form perforations 116 that are separated from one another.

Figure 3:
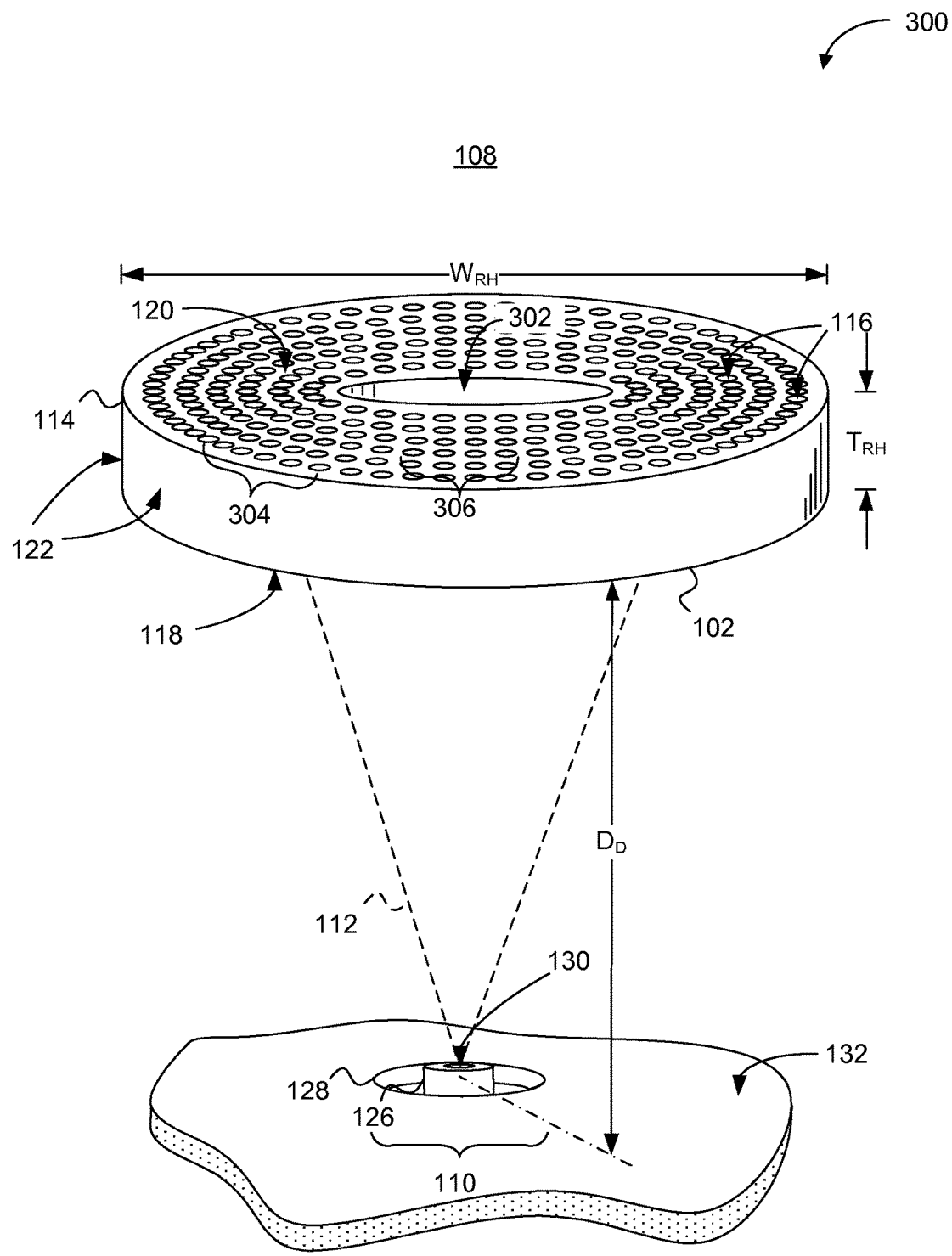
FIG. 3 is a simplified perspective view of the burner system of FIGS. 1A and 1B, including an alternative perforated reaction holder, according to an embodiment.

FIG. 3 is a simplified perspective view 300 of the combustion system of FIGS. 1A and 1B including an alternative perforated reaction holder 102, according to an embodiment. Referring to FIG. 3, the plurality of perforations 116 can include a plurality of hollow cylinders. The reaction holder body 114 can include a fiber reinforced cast refractory material. The plurality of perforations 116 can be formed by drilling through the fiber reinforced cast refractory material. (Perforations may also be referred to as "apertures" or "elongated apertures", which can be considered synonymous.) A void fraction of the perforated reaction holder 102 can be about 0.30.

The perforated reaction holder body 114 can define a central aperture 302, a first set of apertures 304 in a concentric arrangement relative to the central aperture 302 having a selected spacing and size, and a second set of apertures 306 in concentric arrangement relative to the central aperture 302 having a different selected spacing and size. The perforated reaction holder 102 can be configured to hold the fuel combustion reaction (e.g., see FIG. 2, 208) between the input surface 118 and output surface 120 of the perforated reaction holder 102.

Operation of the perforated reaction holder 102 embodiment 300 of FIG. 3 can be visualized with reference to the side sectional view of FIG. 2A. In an embodiment 300 tested by the inventors, a plurality of fuel nozzles (six active nozzles with one central natural draft air source) were distributed in a circle below and about midway between the peripheral surface 122 and the edge of the central aperture 302. The presence of the central aperture 302 was believed to be irrelevant during the tests. While the inventors hypothesized that different sizing and spacing of the concentric arrangements of sets of apertures 304, 306 would provide some value, it was found that the sizes and spacing of the apertures 304, 306 had less effect than other parameters. In particular, as stated above, changing to a higher void fraction of about 0.70 produced lower NOx.

The perforated reaction holder 102 can have a void fraction between 0.10 and 0.90. In an embodiment, the perforated reaction holder can have a void fraction between 0.30 and 0.70. In another embodiment, the perforated reaction holder can have a void fraction of about 0.70.

The void fraction of a perforated reaction holder 102 is defined as the total volume of all perforations 116 (minus the total volume of any perforations that are not functional as perforations), divided by a total volume bounded by the input surface 118, the output surface 120, and the peripheral surface 122, minus any portion of the total bounded volume that is not functional as a perforated reaction holder 102. Some perforated reaction holder 102 embodiments can operate with less than 0.10 void fraction or more than 0.90 void fraction, but the inventors believe that a perforated reaction holder 102 having a void fraction between these limits is preferable. At a low void fraction, a perforated reaction holder 102 may exhibit undesirable pressure drop between the fuel and oxidant mixture (optionally including inert or carrier gas and flue gas) adjacent to the input surface 118 and the reaction fluid (e.g., reaction products, possible reaction intermediates, possible plasma, possible unreacted fuel, unreacted oxidant, and optional inert or carrier gas) adjacent to the output surface 120. The inventors reduced to practice perforated reaction holders respectively having about 0.70 and 0.30 void fractions. Between the two tested void fractions, the 0.70 void fraction perforated reaction holder 102, illustrated in FIG. 1A, produced lower NOx concentration than did the 0.30 void fraction perforated reaction holder 102 (illustrated in FIG. 3, below) At high void fractions (e.g. over about 0.90), the inventors contemplate a situation where the perforated reaction holder 102 could suffer from insufficient perforation surface area or insufficient perforated reaction holder body 114 heat capacity.

Figure 4A:
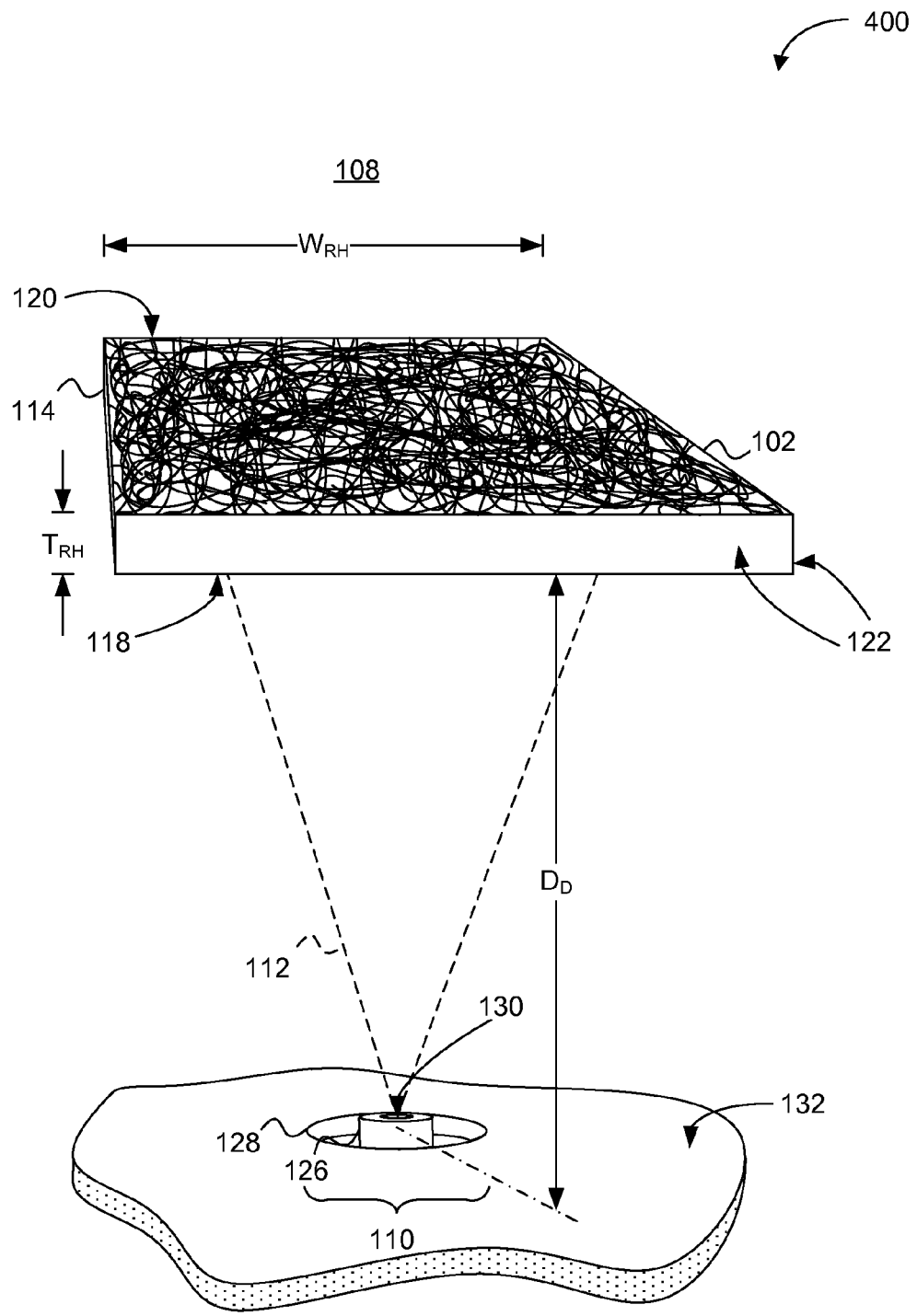
FIG. 4A is a simplified perspective view of the burner system of FIGS. 1A and 1B including another alternative perforated reaction holder, according to an embodiment.
Figure 4B:
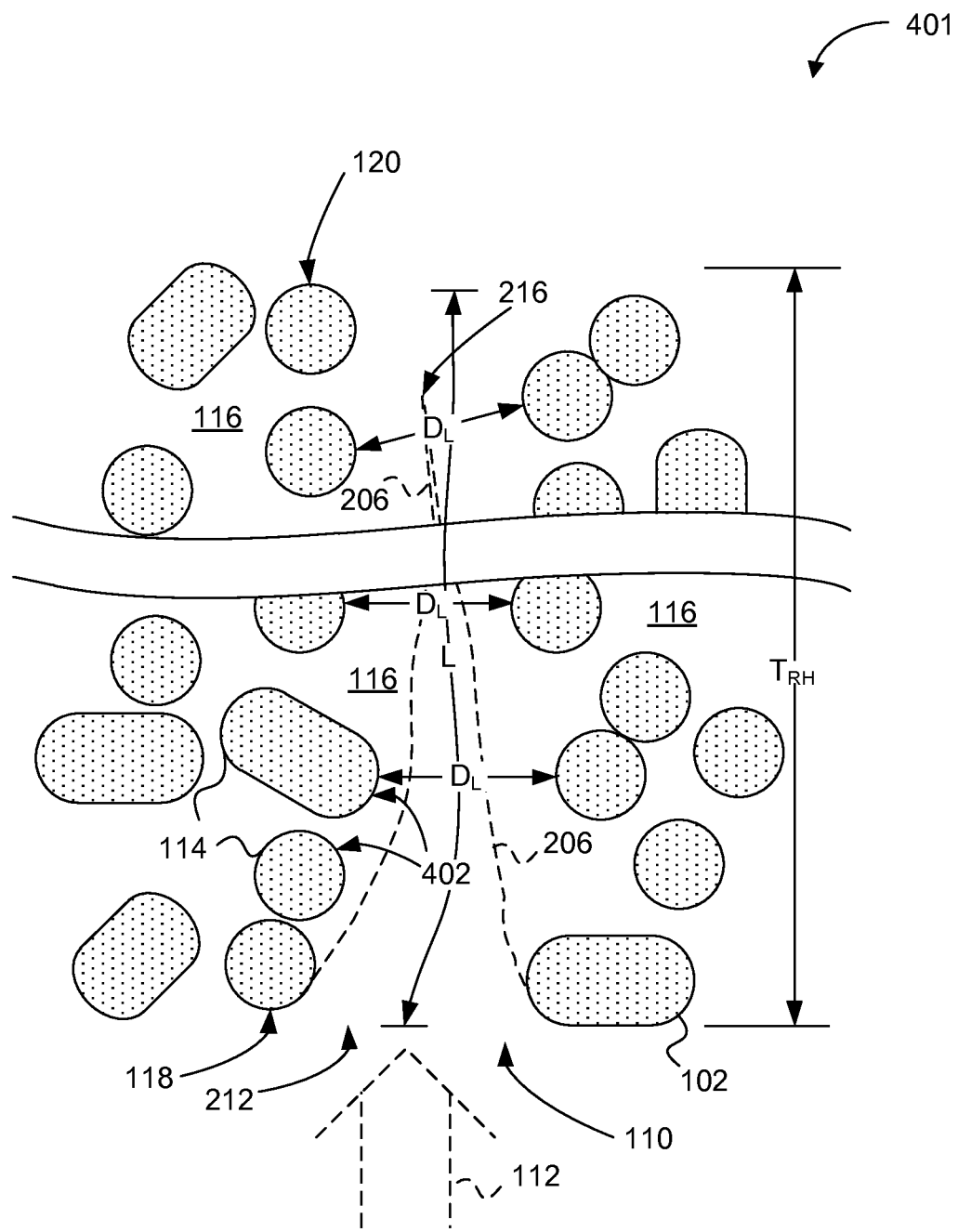
FIG. 4B is a simplified side sectional diagram of a portion of the perforated reaction holder of FIG. 4A, according to an embodiment.

FIG. 4A is a simplified perspective view 400 of the combustion system of FIGS. 1A and 1B including another alternative perforated reaction holder 102 including a discontinuous perforated reaction holder body 114 with branching perforations, according to an embodiment. FIG. 4B is a simplified side sectional diagram 401 of a portion of the perforated reaction holder of FIG. 4A, according to an embodiment.

Referring to FIGS. 4A and 4B, the perforated reaction holder body 114 can be discontinuous. The perforated reaction holder body 114 can define perforations 116 that branch from one another. The perforated reaction holder body 114 can include stacked sheets of material, each sheet having openings non-registered to the openings of a subjacent or superjacent sheet. "Non-registered" openings (described below) refer to openings that cause branching of oxidation fluid flow paths. "Non-registered" openings may, in fact, correspond to patterns that have preplanned differences in location from one another. "Registered" openings, which cause the perforations 116 to be separated from one another, may also have preplanned differences in location from one sheet to another (or may be superpositioned to one another) but "registered" openings do not cause branching, and hence the perforations 116 are separated from one another.

Figure 4C:
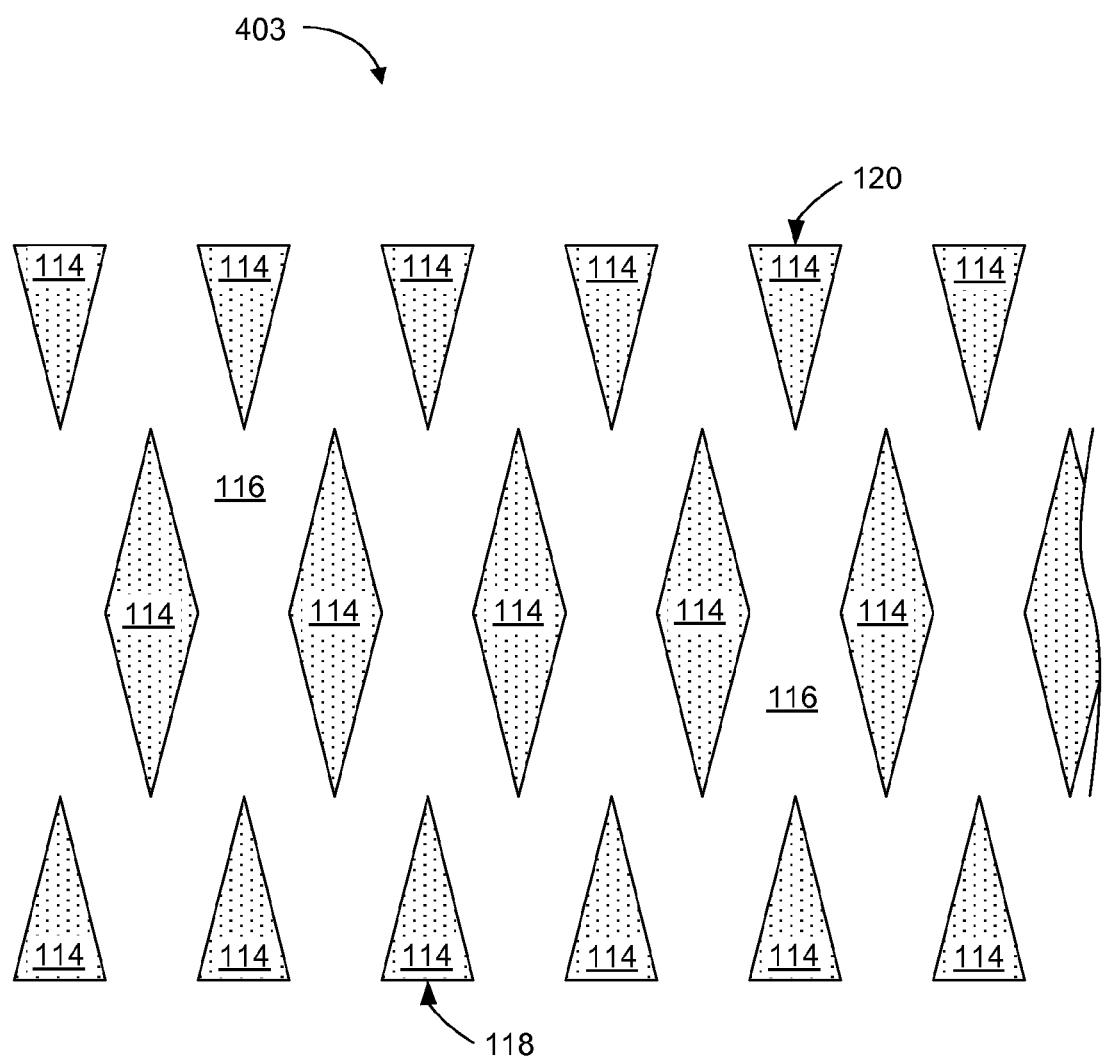
FIG. 4C is a simplified side sectional diagram of a portion of a perforated reaction holder, according to another embodiment.

FIG. 4C is a side sectional view of a perforated reaction holder 102 that has a continuous body 114 and branching perforations 116. The structure 403 of FIG. 4C may, for example, be formed by cross-drilling a solid piece of body 114 material.

Referring again to FIGS. 4A and 4B, the perforated reaction holder body 114 can include fibers 402 including reticulated fibers. The fibers 402 can define branching perforations 116 that weave around and through the fibers 402.

The fibers 402 can include an alumina silicate. For example, the fibers 402 can be formed from extruded mullite or cordierite. In another embodiment, the fibers 402 can include a metal. For example, the fibers 402 can include stainless steel and/or a metal superalloy.

The term "reticulated fibers" refers to a netlike structure. In one embodiment, the fibers 402 are formed from an extruded ceramic material. In reticulated fiber embodiments, the interaction between the fuel and oxidant, the combustion reaction, and heat transfer to and from the perforated reaction holder body 114 functions similarly to the embodiment 200 shown and described above with respect to FIG. 2A. One difference in activity is a mixing between perforations 116, because the fibers 402 form a discontinuous perforated reaction holder body 114 that allows flow back and forth between neighboring perforations.

According to an embodiment, the reticulated fiber network 402 is sufficiently open for downstream fibers to emit radiation for receipt by upstream fibers for the purpose of heating the upstream fibers sufficiently to maintain combustion of a lean fuel and oxidant mixture. Compared to a continuous perforated reaction holder body 114, heat conduction paths 214 between fibers 402 are reduced owing to separation of the fibers. This may cause relatively more heat to be transferred from the heat-receiving region 210 (heat receiving area) to the heat-output region 212 (heat output area) of the perforation wall 204 via thermal radiation 124.

FIG. 4C is a simplified side sectional diagram 403 of a portion of a perforated reaction holder 102 including a continuous perforated reaction holder body with branching perforations, according to an embodiment. The perforated reaction holder embodiment 403 can be made by cross-drilling a continuous reaction holder body 114. The diamond and triangle shaped reaction holder 114 portions are joined by body structure out-of-plane with respect to the sectional view. In order to maintain a desired void fraction (e.g. about 0.70) the relative sizes of the perforations 116 (e.g., drilled holes) and the wall sections therebetween are adjusted to make the walls relatively thicker compared to the wall thickness shown in FIGS. 1A and 2A. Referring to FIG. 4C, the perforated reaction holder body 114 can be continuous. The perforated reaction holder body 114 can define perforations 116 that branch from one another.

Referring to FIGS. 4A, 4B, and 4C, the formation of boundary layers 206, transfer of heat between the perforated reaction holder body 114 and the gases flowing through the perforations 116, characteristic dimension D, and length L can be regarded as related to an average or overall path through the perforated reaction holder 102. In other words, the dimension D can be determined as a root-mean-square of individual Dn values determined at each point along a flow path. Similarly, the length L can be a length that includes length contributed by tortuosity of the flow path, which may be somewhat longer than a straight line distance $T_{RH}$ from the input surface 118 to the output surface 120 through the perforated reaction holder 102. According to an embodiment, the void fraction (expressed as (total perforated reaction holder 102 volume−fiber 402 volume)/total volume)) is about 70%.

Figure 5:
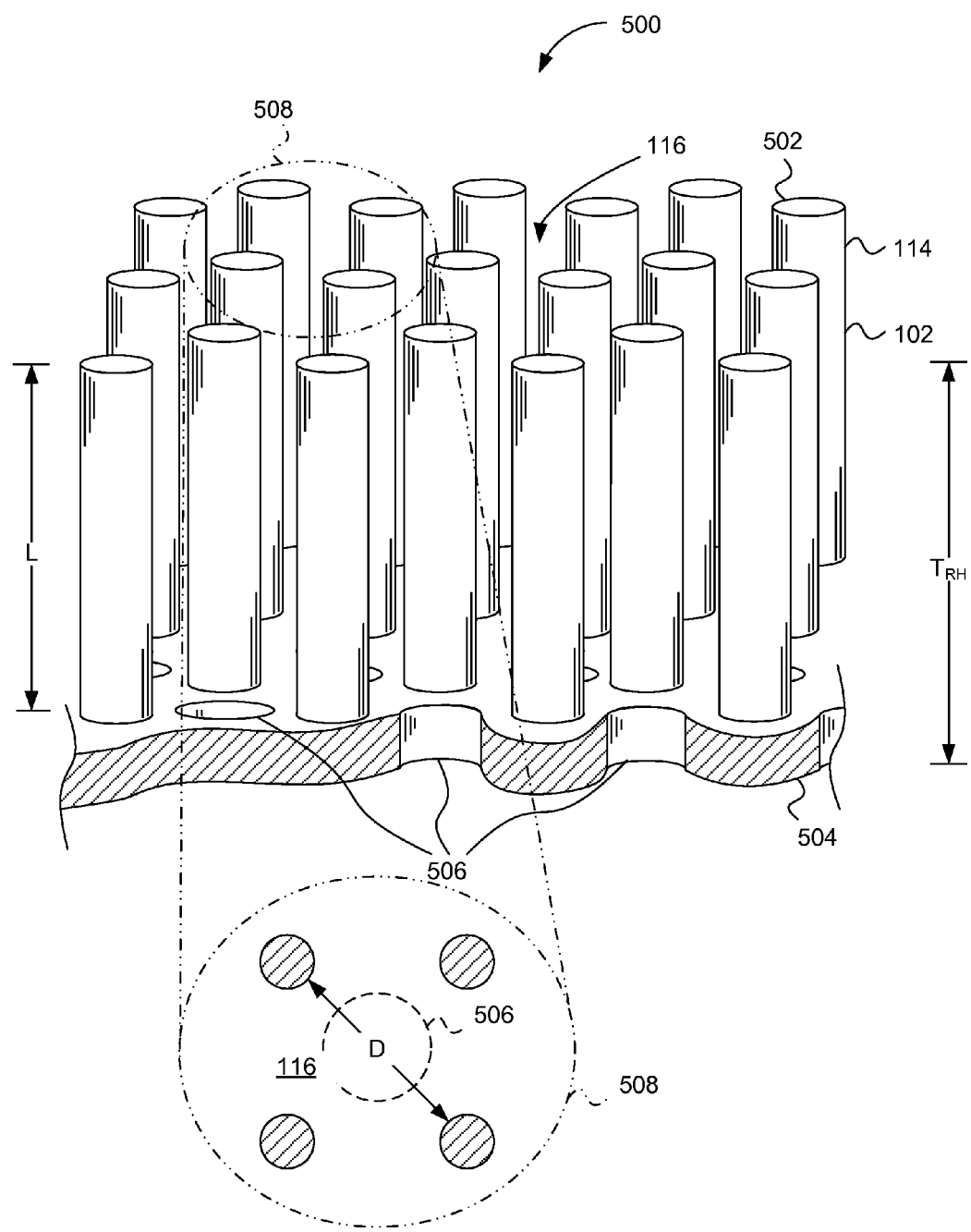
FIG. 5 is a simplified perspective view of an alternative perforated reaction holder including a pillar structure, according to an embodiment.

Referring to FIG. 5, in an alternative form 500 of the perforated reaction holder 102, the perforated reaction holder body 114 can include a plurality of pillars 502. The plurality of perforations 116 can include spaces between the plurality of pillars 502. A base plate 504 can be included and operatively coupled to the plurality of pillars 502. The base plate 504 can define a plurality of apertures 506 configured to allow combustion fluid to flow into the perforations 116 between the pillars 502. The base plate 504 can include a perforated metal sheet including openings selected to allow combustion fluid to flow into the perforations 116 between the pillars 502.

Figure 6:
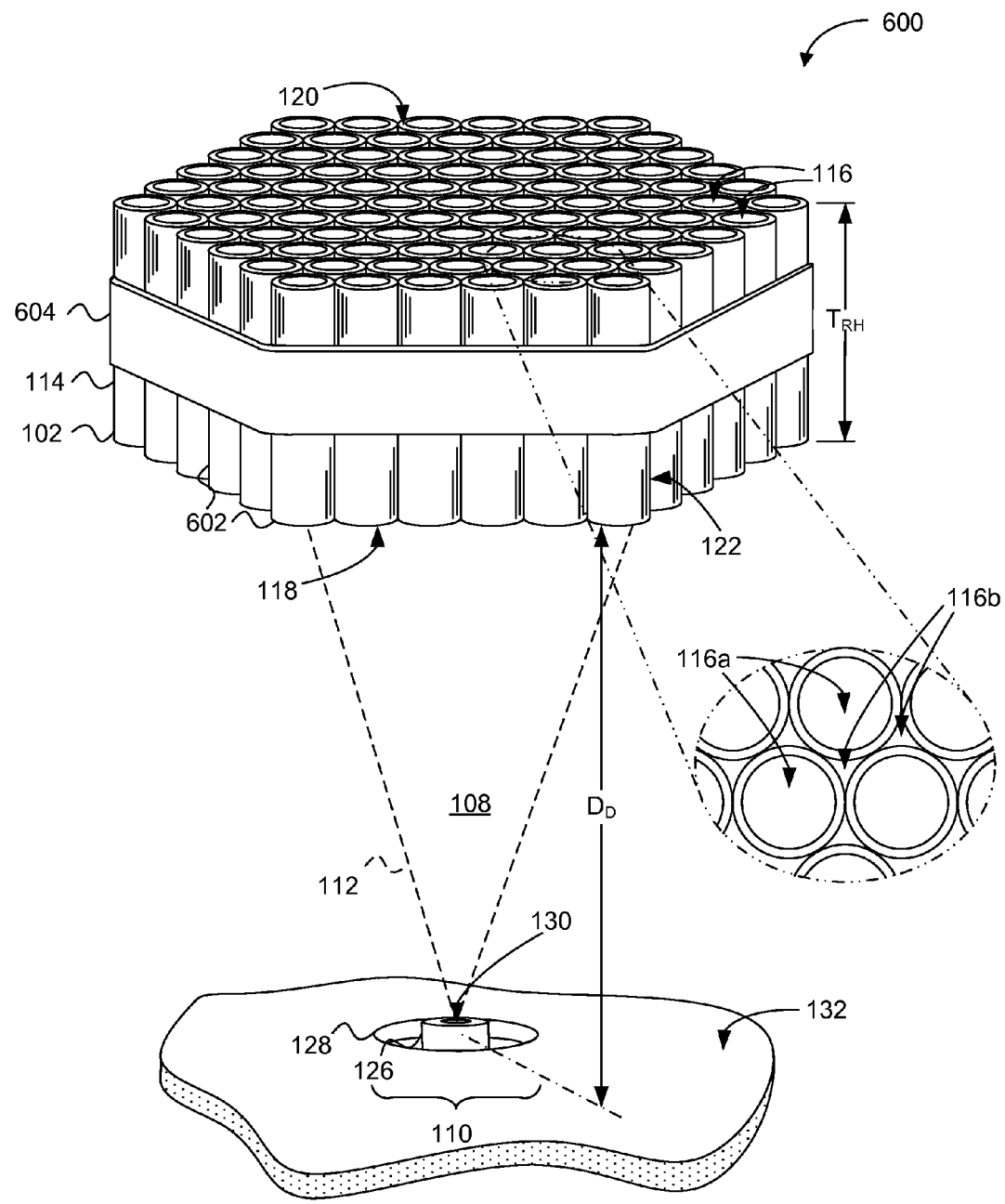
FIG. 6 is a simplified perspective view of an alternative perforated reaction holder including a tube bundle structure, according to an embodiment.

Referring to FIG. 6, the perforated reaction holder body 114 can include a plurality of tubes 602 bundled together. The plurality of perforations 116 can include hollow cylinders 116a inside the plurality of tubes 602. The plurality of perforations 116 can also include interstitial spaces 116b between the bundled tubes 602. The plurality of tubes 602 can include ceramic tubes and a metal tension member 604 circumferential to the plurality of tubes 602 arranged to hold the plurality of tubes 602 together. The metal tension member 604 can include stainless steel, a superalloy metal wire, and/or a superalloy metal band.

In an embodiment, the plurality of tubes 602 can include ceramic tubes. Refractory cement can be included between the tubes 602 and configured to adhere the tubes together. Alternatively, the plurality of tubes 602 can include metal tubes.

In addition to embodiments described above, the inventors contemplate a range of alternative physical structures of perforated reaction holders configured to function and produce effects similar to alternatives described above.

The perforated reaction holder body 114 can include stacked sheets of material, each sheet having openings non-registered to the openings of a subjacent or superjacent sheet, to form branching perforations 116.

The perforated reaction holder body 114 can be discontinuous and can define perforations 116 that branch from one another. The perforated reaction holder body 114 can include stacked sheets of material, each sheet having openings non-registered to the openings of a subjacent or superjacent sheet. The perforated reaction holder body 114 can include a plurality of perforated sheets stacked together to form a plurality of flow paths comprising the perforations 116. The perforated sheets can include perforated metal sheets, ceramic sheets and/or expanded sheets.

In another embodiment, the perforated reaction holder body 114 comprises a discontinuous packing bodies and the perforations 116 are formed in the interstitial spaces between the discontinuous packing bodies. In one example, the discontinuous packing bodies include structured packing shapes. In another example, the discontinuous packing bodies include random packing shapes. For example, the discontinuous packing bodies can include ceramic Raschig ring, ceramic Berl saddles, ceramic Intalox saddles, and/or metal rings (e.g. Super Raschig Rings). The perforated reaction holder 102 can further include a metal cage configured to hold the ceramic balls.

A number of aspects distinguish the perforated reaction holder 102 over earlier burner apparatuses. In one aspect, the combustion front can freely move upstream and downstream responsive to a decrease or increase in flow velocity, respectively. This is because the thermal boundary layer thickness at any given location varies with fuel and air velocity such that the merger point 216, and hence complete combustion location varies naturally responsive to changes in conditions. In this respect, the perforated flame holder will not prevent propagation of a flame upstream across a range of operating temperatures.

On simplified way of looking at this is to compare the dimension D to a fuel characteristic known as "quenching distance." It should be noted that perforated flame holders that have lateral dimensions less than published quenching distances have been successfully tested by the inventors. On the other hand, earlier apparatuses (that operate using different principles) typically require that any porosity in the flame holder be limited to sizes less than quenching distance in order to avoid potentially explosive travel of the combustion reaction into a fuel and air mixture volume that can undergo conflagration or detonation. The inventors have found that, in embodiments described herein, lateral dimensions D greater than the flame quenching distance can be useful for allowing longer thickness L (having greater mechanical stability) and also for reducing flow back pressure.

In some embodiments, the perforations 116 can be each characterized by a lateral dimension D equal to or greater than a flame quenching distance.

The quenching distance is evaluated under stoichiometric conditions. It is generally considered a property of the fuel and exists as a tabulated property. Most hydrocarbons have quenching distances of about 0.1". For example, NACA Lewis Report 1300 tabulates quenching distance as shown in Table 1.

The quenching distance represents the diameter of an orifice such that a stoichiometrically premixed flame cannot propagate upstream through the orifice into a premix reservoir. The mechanism is essentially one of heat abstraction—the flame giving up too much energy as it attempts to flashback through the orifice. Since this is a thermal argument, actual flashback can occur through the quenching distance if the orifice is very hot—for example, if a premixed burner reservoir is receiving radiant heat from a hot furnace, e.g., a premix burner in ethylene service. But even so, in general the quenching distance does not change dramatically inasmuch as the flow of premixed fuel and air tend to cool the orifice.

In contrast to perforated flame holders 202 described herein, radiant burners that support surface combustion must have a minimum pore size less than the quenching distance for the particular fuel and temperature to avoid flashback, and it could be considered a tautology that if the flame flashes back, the pore size must be greater than the actual quenching distance under the operating conditions.

Quenching distances for several fuels under standard conditions are tabulated in Table 1, below.

TABLE 1

FUEL QUENCHING DISTANCES

| HYDROCARBON FUEL | QUENCHING DISTANCE |
|---|---|
| n-Butane | 0.12" |
| Methane | 0.10" |
| Propane | 0.08" |
| Hydrogen | 0.025" |

The inventors found that for a given flow velocity, a larger dimension D in an elongated aperture (also referred to as a coarser mesh of a honeycomb flame holder) requires a larger length L of the perforation 116 in to reach the lowest NOx production. For tested combinations, the length L was equal to the distance between the input surface 302 and output surface 304 (also referred to as thickness $T_{RH}$) of the perforated reaction holder 102. Similarly, smaller D was found to operate effectively with a smaller perforation length L.

According to various embodiments, the perforations 116 of the perforated reaction holder 102 are configured to hold a flameless combustion reaction supported by the fuel and oxidant mixture 112 substantially within the perforated reaction holder body 114.

A flameless combustion reaction refers to a combustion reaction that occurs volumetrically within the perforations such that no stoichiometric edge between a fuel-rich region and an oxidant-rich region exists. In a normal flame, the visible edge of the flame represents a stoichiometric surface. Since a stoichiometric mixture burns hotter than fuel-lean and fuel-rich mixtures, and since the production of oxides of nitrogen (NOx) is a function of combustion temperature, eliminating the hot, visible stoichiometric surface results in a significant reduction in [NOx] (NOx concentration) in the combustion products.

FIG. 7A is a partial side sectional view of a furnace including a perforated reaction holder 102, according to an embodiment. As used herein, the term furnace refers to a fuel combustion heater used for a wide range of industrial, commercial, and domestic applications such as steam generation for heating, propulsion, and generation of electricity; process heating used in oil refineries and other chemical plants such as for heating endothermic reactions, cracking petroleum, and heating distillation columns; metallurgical refining and production heating; kiln firing; and residential air and water heating systems. Other uses of furnaces will be apparent to those skilled in the art. Unless dictated to the contrary by context, furnace may be regarded as synonymous with burner or combustor.

According to an embodiment, the furnace 700 includes a fuel and air source 110 disposed to output fuel and air into a combustion volume 108 to form a fuel and air mixture 112. A perforated reaction holder 102 is disposed in the combustion volume 108, the perforated reaction holder 102 includes a perforated reaction holder body 114 defining a plurality of perforations 116 aligned to receive the fuel and air mixture 112 from the fuel and air source 110. A perforated reaction holder support structure 708 is configured to support the perforated reaction holder 102 at a distance $D_D$ from the fuel and air source 704.

The perforations 116 can be configured to collectively hold a major portion of a combustion reaction (e.g., see FIG. 2, 208) supported by the fuel and air mixture 112.

Holding the major portion of the combustion reaction 208 can include causing over half of total heat produced by the combustion reaction 208 to be produced between an input surface 118 and an output surface 120 of the perforated reaction holder 102. In another embodiment, holding the major portion of the combustion reaction 208 can include causing at least 80% of total heat produced by the combustion reaction 208 to be produced between an input surface 118 and an output surface 120 of the perforated reaction holder 102. In another embodiment, holding the major portion of the combustion reaction 208 comprises causing at least 98% of total heat produced by the combustion reaction 208 to be produced between an input surface 118 and an output surface 120 of the perforated reaction holder 102.

Holding the major portion of the combustion reaction 208 can include converting of over half of consumed fuel to combustion products $CO_2$ and $H_2O$ within the perforations 116. In another embodiment, holding the major portion of the combustion reaction 208 can include converting at least 80% of consumed fuel to combustion products $CO_2$ and $H_2O$ within the perforations 116. In another embodiment, holding the major portion of the combustion reaction 208 can include converting at least 98% of consumed fuel to combustion products $CO_2$ and $H_2O$ within the perforations 116

Holding the major portion of the combustion reaction 208 can include supporting combustion such that visible flame extension 208$p$ from an input surface 118 of the perforated flame holder toward the fuel and air source 704 is less in distance than a thickness $T_{RH}$ of the perforated reaction holder 102. In another embodiment, holding the major portion of the combustion reaction 208 can includes supporting combustion such that visible flame extension 208$d$ from an output surface 120 of the perforated flame holder away from the fuel and air source 704 is less in distance than three times a thickness $T_{RH}$ of the perforated reaction holder 102. In another embodiment, holding the major portion of the combustion reaction 208 can include supporting combustion such that visible flame extension 208$d$ from an output surface 120 of the perforated flame holder away from the fuel and air source 704 is less in distance than a thickness $T_{RH}$ of the perforated reaction holder 102.

The perforated reaction holder 102 was found, in some tests, to reduce visible flame height by 90% or more compared to an equal output combustion reaction held by a conventional burner tile. In other tests, the perforated reaction holder 102 was found to nearly or completely eliminate visible flames, with substantially all combustion being completed inside the perforated reaction holder 102. During these later tests, the perforated reaction holder 102 glowed bright yellow (more particularly red-orange to bright yellow, depending on fuel turndown), indicating high blackbody radiation being emitted from perforation walls and end surfaces 118, 120 of the perforated reaction holder body 114.

The fuel and air source 110 can further include a fuel nozzle 126 configured to output fuel toward the perforated reaction holder 102 through an orifice 130 having a diameter and an air source 128 configured to output air carrying oxygen into the combustion volume 108. The fuel and air respectively from the fuel and air sources 126, 128 can mix to form the fuel and air mixture 112 as the fuel and air pass through a distance $D_D$ between the fuel and air source 110 and the perforated reaction holder 102.

The distance $D_D$ can include a dilution distance. The dilution distance $D_D$ can be greater than 20 times the orifice 130 diameter. In another embodiment, the dilution distance $D_D$ is equal to or greater than 100 times the orifice 122 diameter. In another embodiment, the dilution distance $D_D$ is about 245 times the orifice 122 diameter.

Fuel and air source 110 can be configured to output a fuel-rich portion and a fuel-lean portion that mix via vortices separated by Taylor layers as the fuel and air pass through the dilution distance $D_D$. The dilution distance $D_D$ can be sufficient to cause vortex engulfment to eliminate the Taylor layers where the fuel and air mixture reaches the perforated reaction holder 102.

At a dilution distance of greater than 20 nozzle diameters, the fuel and air source 110 can be configured to deliver to the perforated reaction holder 102 a diluted fuel and oxidant mixture 112 having less than 0.1% of the fuel and oxidant mixture 112 with greater than one-half the concentration of fuel in the fuel-rich portion. The fuel source can be configured to output pure fuel. Under this condition, at least 99.9% of the fuel and oxidant mixture 112 includes fuel diluted at least 2:1 with air.

In another embodiment, the fuel and air source 110 can be configured to deliver to the perforated reaction holder 102 a diluted fuel and oxidant mixture having less than 0.1% of the fuel and oxidant mixture 112 with greater than one-tenth the concentration of fuel rich portion. If the fuel source is configured to output pure fuel, at least 99.9% of the fuel and air mixture 112 includes fuel diluted at least 10:1 with air.

The fuel dilution values described above refer to the minimum amount of dilution of the fuel or fuel rich portion dilution. Instantaneously, streams of fuel and air at various mixtures reach the perforated reaction holder 102. On a time-averaged basis, fuel mixture tends to vary on a Gaussian distribution with the richest mixture on a centerline of the fuel propagation direction, near the center of the perforated reaction holder 102 and the leanest mixtures being farther off axis. However, instantaneously, the mixture at any location across the fuel and air propagation cone can be relatively rich or relatively lean.

The inventors have determined that propagation through a dilution distance $D_D$ of greater than 20 nozzle diameters results in dilution of a fuel-rich portion such that less than 0.1% of the mixture within the propagation cone is mixed with greater than 0.5 times the richness output from the nozzle. At 100 nozzle diameters, less than 0.1% within the propagation cone has a mixture greater than 0.1 times the richness output from the nozzle.

At either distance, the average fuel richness is much less than them maximum richness. Under one set of conditions, described below, the inventors found that minimum NOx output occurred at a dilution distance of 265 nozzle diameters from the nozzle orifice. At this distance, the average fuel mixture was too dilute to support combustion with normal bluff body flame holders. In some test runs, the high dilution resulted in a lower combustion temperature, which reduced thermal NOx production to below the detection limit of laboratory instrumentation.

Figure 7B:
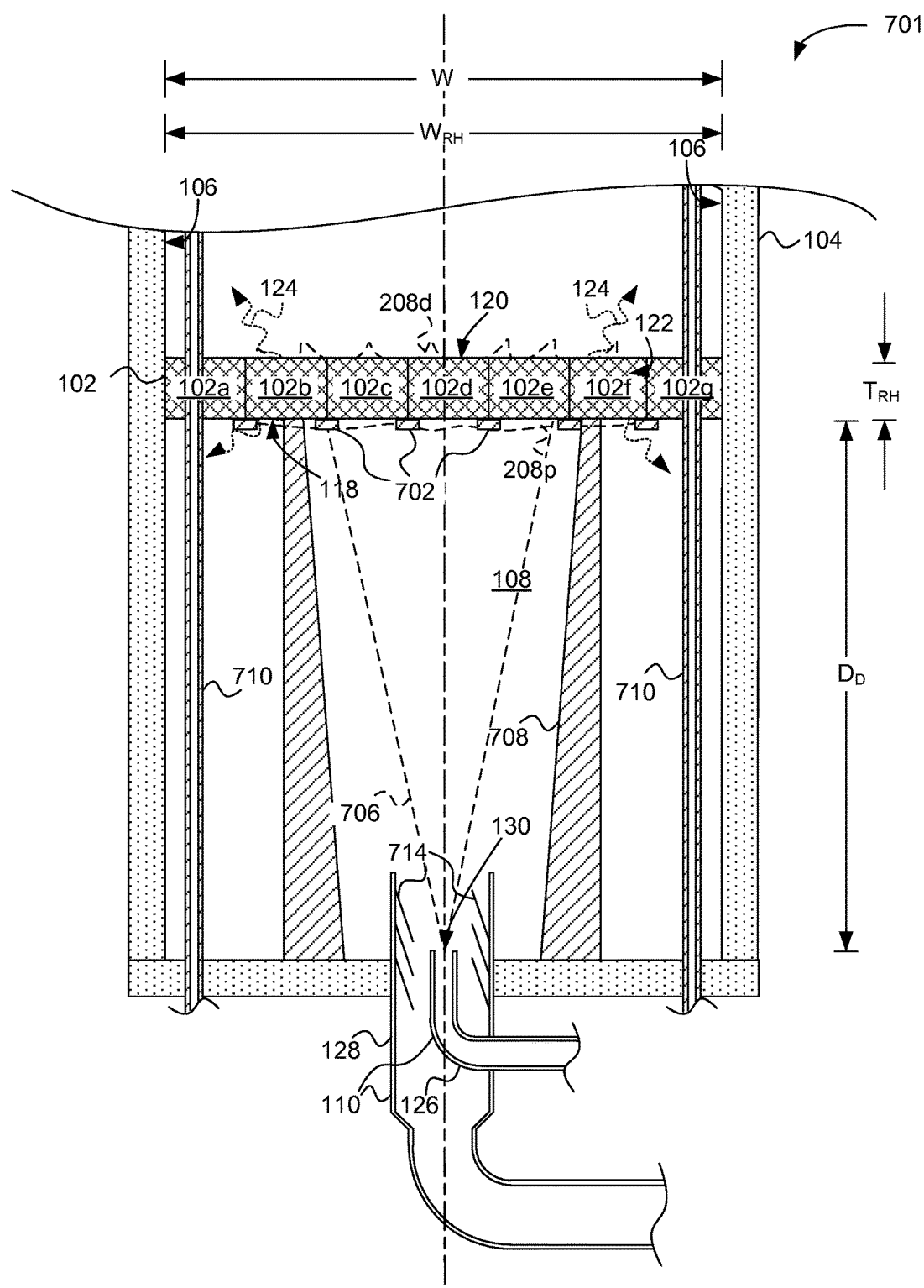
FIG. 7B is a simplified side sectional view of a furnace including a perforated reaction holder, according to another embodiment.

Referring to FIG. 7B, the furnace 701 can further include furnace walls 106 defined by a furnace body 104, the furnace walls 106 defining the combustion volume 108 having a lateral extent W. The perforated reaction holder 102 can have a lateral extent $W_{RH}$ defined by a peripheral wall 122. The lateral extent $W_{RH}$ of the perforated reaction holder 102 can be substantially equal to the lateral extent W of the combustion volume 108.

Referring to FIG. 7A, the furnace 700 can further include furnace walls 106 defined by a furnace body 104, the furnace walls 106 defining the combustion volume 108 having a lateral extent W. The perforated reaction holder 102 can have a lateral extent $W_{RH}$ defined by a peripheral wall 122. The lateral extent $W_{RH}$ of the perforated reaction holder 102 is less than the lateral extent W of the combustion volume 108. A region between the peripheral wall 122 of the perforated reaction holder 102 and the walls 106 of the combustion volume 108 can be selected to allow natural circulation of flue gas 712 from a region of the combustion volume 108 distal from a region between the fuel and air source 110 and the perforated reaction holder 102 to a region of the combustion volume 108 between the fuel and air source 110 and the perforated reaction holder 102.

The fuel and air source 110 can be configured to output the fuel and air such that flue gas is entrained in the fuel and air mixture 112 as the fuel and air traverse the distance $D_D$ between the fuel and air source 110 and the perforated reaction holder 102.

An embodiment can further include a furnace floor 132 defined by a furnace body 104. The support structure 708 can be configured to support the perforated reaction holder 102 from the combustion volume floor 132.

The perforated reaction holder 102 can include a plurality of sections 102a, 102b, 102c, 102d. A perforated reaction holder section support structure 702 can be included and operatively coupled to the perforated reaction holder support structure 708. The perforated reaction holder section support structure 702 can be configured to support the sections 102a, 102b, 102c, 102d forming the perforated reaction holder 102.

The perforated reaction holder section support structure 702 can include a metal superalloy. For example, the perforated reaction holder section support structure 702 can include Inconel. In another embodiment, the perforated reaction holder support structure 708 can include a refractory brick.

According to an embodiment, the furnace 700, 701 can further include a furnace body 104 defining furnace walls 106, the furnace walls comprising a nonmetallic refractory material; and a plurality of radiant section working fluid tubes 710 disposed between the perforated reaction holder peripheral surface 122 and the furnace walls. The perforated reaction holder can be configured to emit thermal radiation 124 to heat the plurality of radiant section working fluid tubes 710 and the furnace walls 106. In another embodiment (not shown) the furnace body 104 can include "water walls" that include tubes for circulating a working fluid in the walls. This approach is typical for water-tube boilers used in large applications such as power generation.

The fuel and air source 110 can include swirl vanes 714, the swirl vanes being disposed to aid fuel and air mixing without providing sufficient mixing to cause the combustion reaction to be supported by the fuel and air source 110.

Figure 8:
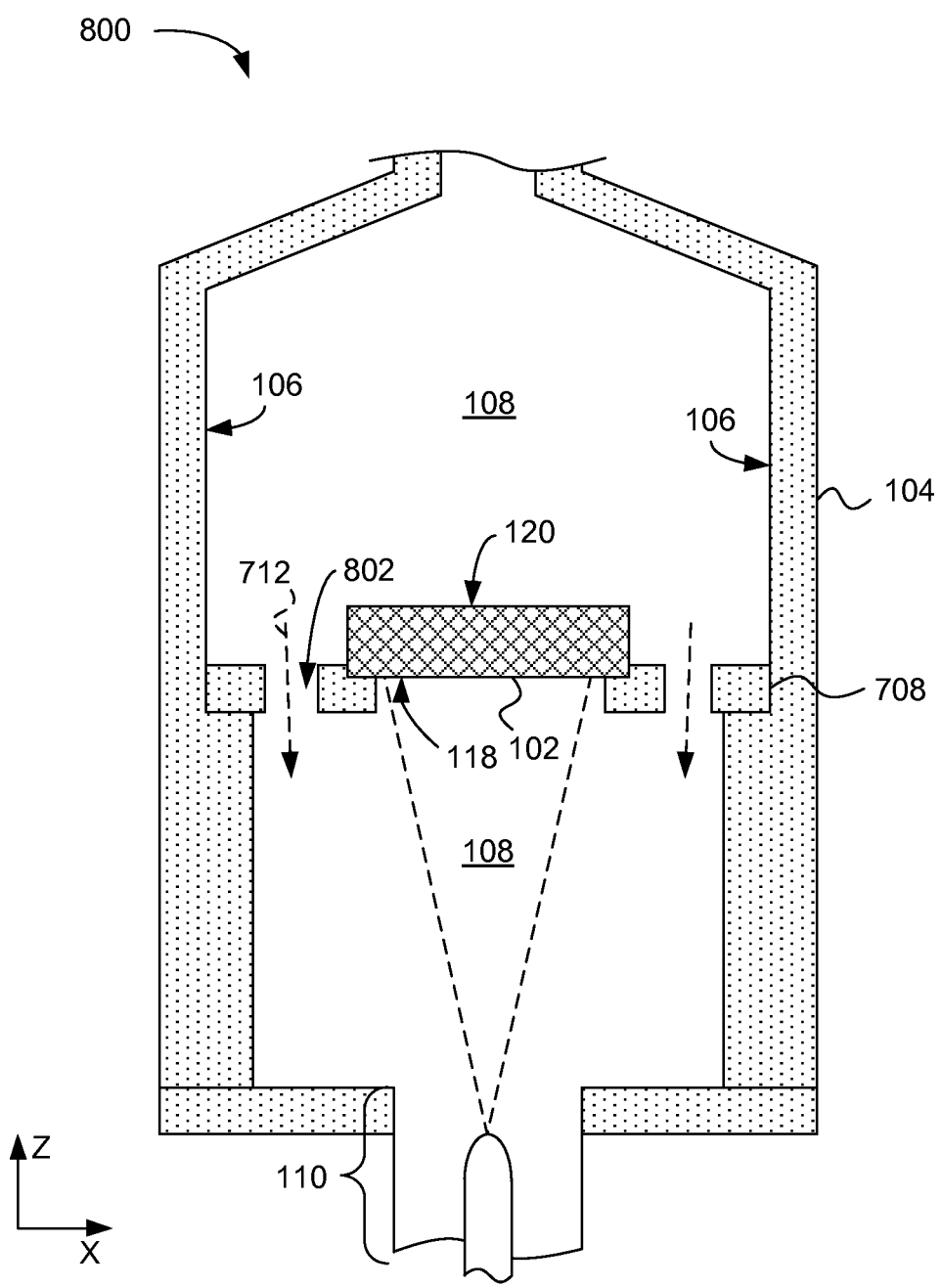
FIG. 8 is a side sectional view of a portion of a furnace, including perforated reaction holder, according to another embodiment.

FIG. 8 is a side sectional view of a furnace 800 including a perforated reaction holder support structure 708 that is supported from furnace walls 106, according to an embodiment.

The furnace 800 including a perforated reaction holder support structure 708 that is supported from furnace walls 106 further includes a furnace body 104 defining furnace walls 106. The perforated reaction holder support structure 708 can be supported from the furnace walls 106.

The perforated reaction holder support structure 708 can define apertures 802 selected to allow natural circulation of flue gas 712 from a region of the combustion volume 108 distal from a region between the fuel and air source 110 and the perforated reaction holder 102 to a region of the combustion volume 108 between the fuel and air source 110 and the perforated reaction holder 102.

FIG. 9A is a diagrammatic depiction of a combustion system 900, according to an embodiment. The combustion system 900 includes a fuel and oxidant source 110 configured to output fuel and oxidant as a fuel and oxidant mixture 112. A perforated reaction holder 102 aligned to receive the fuel and oxidant mixture 112 across an input surface 118 including a plurality of perforations 116. A heating apparatus 902 configured to cause heating of the perforated reaction holder 102. The perforated reaction holder 102 is configured to support a combustion reaction supported by the fuel and oxidant mixture 112 in the plurality of perforations 116 after the heating apparatus 902 preheats the perforated reaction holder 102.

Figure 9B:
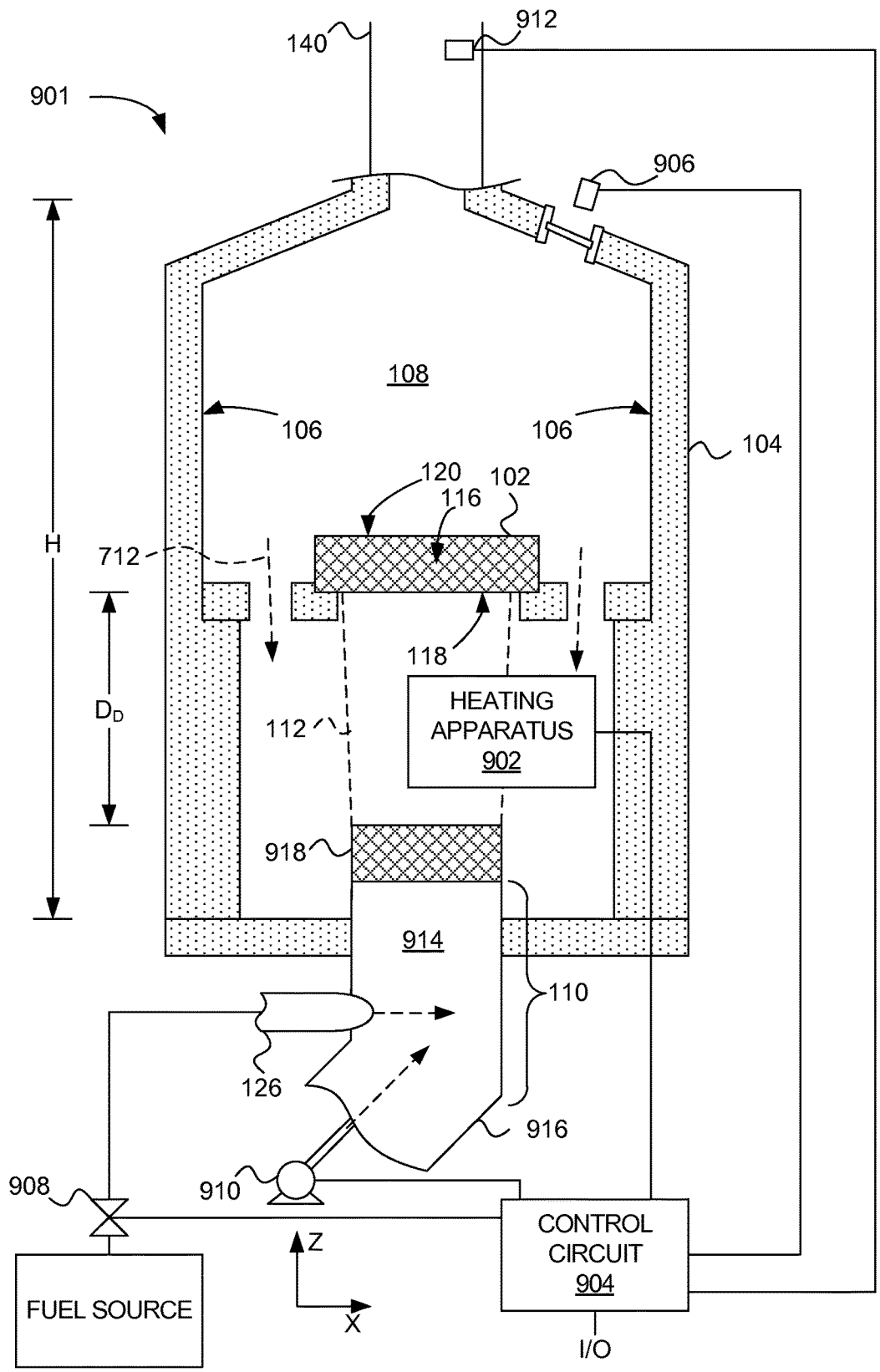
FIG. 9B is a diagram of a combustion system including a perforated reaction holder and a premix fuel and oxidant source, according to an embodiment.

FIG. 9B is a diagrammatic depiction of a combustion system 901 including a premix fuel and oxidant source 110, according to an embodiment. The premix fuel and oxidant source 110 is configured to output a premixed stream of fuel and air 112 into a combustion volume 108. A perforated reaction holder 102 includes an input surface 118 aligned to receive the premixed stream of fuel and air. The perforated reaction holder 102 includes a plurality of perforations 116 having openings distributed across the input surface 118, the plurality of perforations being collectively configured to support a combustion reaction.

The premix fuel and oxidant source can include a premix chamber 914, a fuel nozzle 126 configured to output fuel into the premix chamber, and an air channel 916 configured to output combustion air into the premix chamber. A flame arrestor 918 can be configured to prevent flame flashback into the premix fuel and oxidant source 110.

According to an embodiment, the perforated reaction holder 102 is disposed a distance $D_D$ from the flame arrestor 918 sufficient to prevent radiation heating of the flame arrestor 918 sufficient to reduce the effectiveness of the flame arrestor 918 in stopping flame propagation therethrough.

According to an embodiment, the perforated reaction holder 102 is disposed away from walls 106 of the combustion volume 108. The separation of the perforated reaction holder 102 from the walls of the combustion volume 108 provides a channel for natural flue gas circulation 712 from a portion of the combustion volume above an output surface 120 of the perforated reaction holder 102 to a portion of the combustion volume 108 between the premix fuel and air source 110 and the input surface of the perforated reaction holder 102. The premix fuel and air source 110 is configured to output a fuel and air mixture 112 selected to entrain the circulated flue gas prior to reaching the input surface 118 of the perforated flame holder.

Referring to FIGS. 9A and 9B, the combustion system 900, 901 can further include a control circuit 904 operatively coupled to the heating apparatus 902, the control circuit 904 being configured to cause the heating apparatus 902 to operate.

The control circuit 904 can further include a heat sensor 906 operatively coupled to the control circuit 904, the heat sensor 906 being configured to detect a temperature of the perforated reaction holder 116. The control circuit 904 can be configured to control the heating apparatus 902 responsive to input from the heat sensor 906. The control circuit can be configured to cause the heating apparatus 902 to maintain the temperature of the perforated reaction holder 102.

A fuel control valve 908 can be included and configured to control a flow of fuel from a fuel source 910 to the fuel and oxidant source 110, the fuel control valve being operatively coupled to the control circuit 904.

The control circuit 904 can further include a combustion sensor 906 operatively coupled to the control circuit 904, the combustion sensor 906 being configured to detect a temperature of the perforated reaction holder 116. The fuel control valve 908 can be configured to control a flow of fuel from a fuel source 910 to the fuel and oxidant source 110, the fuel control valve being operatively coupled to the control circuit 904. The control circuit 904 can be configured to control the fuel control valve 908 responsive to input from the combustion sensor 906. The control circuit 904 can be configured to control the fuel control valve 908 to maintain an operating temperature of the perforated flame holder 102. The control circuit can be configured to control the heating apparatus 902 to heat the perforated reaction holder 102 to an operating temperature prior to controlling the fuel control valve 908 to cause output of the fuel and oxidant mixture 112 to the perforated reaction holder 102.

A blower 910 can be included and operatively coupled to the control circuit 904 and configured to force air through the fuel and air source 110.

The control circuit 904 can further include an oxygen sensor 912 disposed to detect oxygen concentration in an exhaust flue 124 and operatively coupled to the control circuit 904.

Figure 10:
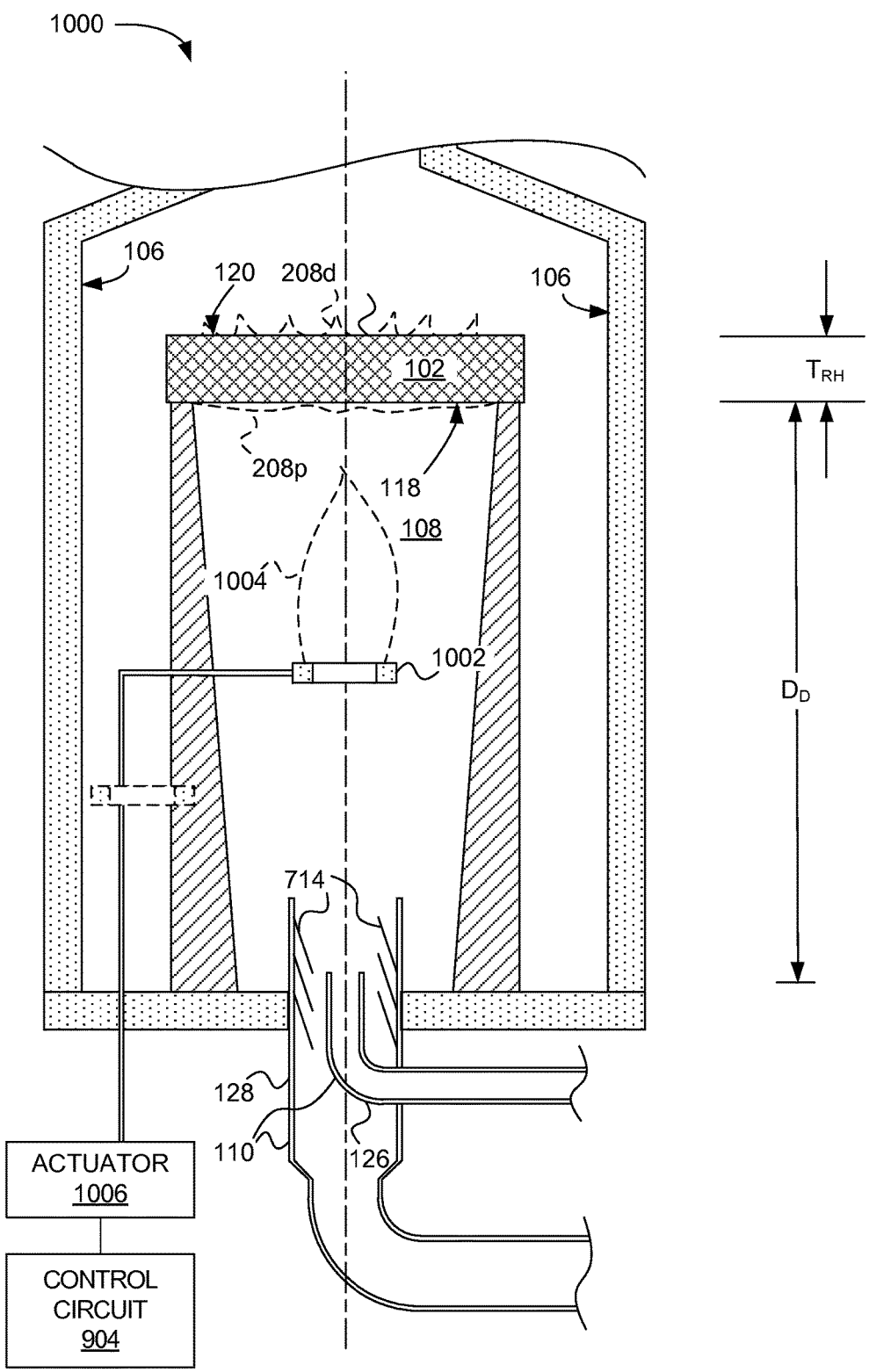
FIG. 10 is a sectional view of a portion of a combustion system, according to an embodiment.

Referring to FIG. 10, the heating apparatus (shown as 902 in FIGS. 9A and 9B)can include a flame holder 1002 configured to support a flame 1004 disposed to heat the perforated reaction holder 102.

The fuel and oxidant source 110 can include a fuel nozzle 126 configured to emit a fuel stream and an air source 128 configured to output combustion air adjacent to the fuel stream. The fuel nozzle 126 and air source 128 can be configured to output the fuel stream to be progressively diluted by the combustion air. The perforated reaction holder 102 can be disposed to receive a diluted fuel and air mixture 112 that supports a lean combustion reaction that is stabilized by the perforated reaction holder 102 when the perforated reaction holder 102 is at an operating temperature. The flame holder 1002 can be configured to support the flame 1004 at a location corresponding to a rich fuel and air mixture 112 that is stable without stabilization provided by the heated perforated reaction holder 102.

The heating apparatus (shown as 902 in FIGS. 9A and 9B) can further include a control circuit 904 and a flame holder actuator 1006 operatively coupled to the control circuit 904 and the flame holder 1002. The control circuit 904 can be configured to cause the flame holder actuator 1006 to cause the flame holder 1002 to not hold the flame 1004 when the perforated flame holder 102 is at an operating temperature.

Figure 11:
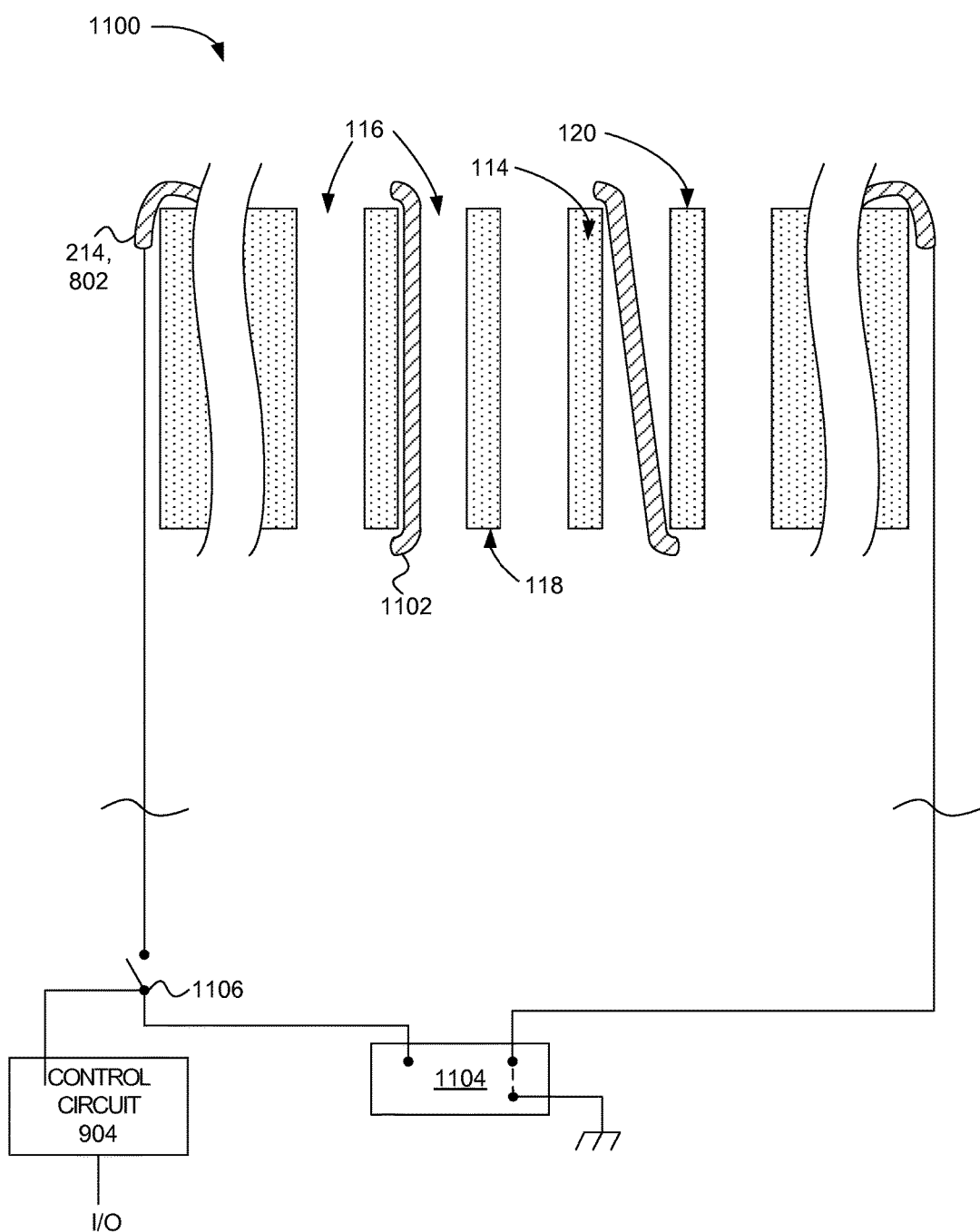
FIG. 11 simplified sectional view of a perforated reaction holder including a heating apparatus and a block diagram of other related apparatuses, according to an embodiment.

FIG. 11 is a side sectional diagram 1100 of a portion of a perforated flame holder 102 equipped with a heating apparatus 902 including an electrical resistance heater 1102 configured to output heat to the perforated flame holder 102, according to an embodiment. The heating apparatus 902 can include an electrical resistance heater 1102 operatively coupled to the perforated reaction holder 102. The electrical resistance heater 1102 can be configured to heat up the perforated reaction holder 102 to an operating temperature. Additionally or alternatively, the electrical resistance heater 1102 can be configured to heat the perforated reaction holder 102 to prevent the perforated reaction holder 102 falling below an operating temperature.

The heating apparatus 902 can further include a power supply 1104 and a switch 1106 operable to selectively couple the power supply 1104 to the electrical resistance heater 1102. The heating apparatus 902 can further include a control circuit 904 operatively coupled to the switch 1106. The control circuit 904 can be configured to control the switch to selectively couple the power supply 1104 to the electrical resistance heater 1102. The control circuit 904 can optionally enable the electrical resistance heater 1102 during times of low fuel flow, in order to maintain the temperature of the perforated flame holder 102 at a selected operating temperature.

The heating apparatus is further used for start-up. Upon receiving a start-up command via the control circuit 904, the switch 1106 can close for a period of time sufficient to heat the electrical resistance heater 1102 and portions of the perforated flame holder 102 adjacent to the electrical resistance heater 1102. The control circuit 904 can then open a fuel control valve (e.g., see FIGS. 9A, 9B, 908) to start combustion in the perforated reaction holder 102.

The electrical resistance heater 1102 can be formed in various ways. For example, the electrical resistance heater 1102 can be formed from KANTHAL wire (available from Sandvik Materials Technology division of Sandvik AB of Hallstahammar, Sweden) threaded through at least a portion of elongated apertures formed by the perforated flame holder body 114. Alternatively, the heater 1102 can include an inductive heater, a high energy (e.g. microwave or laser) beam heater, a frictional heater, or other types of heating technologies.

In an embodiment using a 48 inch length of Kanthal wire threaded through the perforated flame holder 102, the controller can cause a power supply 1104 outputting 90 VAC into electrical continuity with the electrical resistance heater 1102 for about 45 seconds. After 45 seconds, the control circuit 904 can open a fuel valve (908, FIGS. 9A, 9B) and start a fan (910, FIGS. 9A, 9B) to deliver an air and fuel mixture 112 to the perforated flame holder 102. After ignition of the fuel and air in the perforated flame holder 102, for example after about 95 seconds, the control circuit 904 opens the switch 1106 to stop outputting heat with the electrical resistance heater 1102. As the perforated reaction holder 2102 heats up, the control circuit 904 then increases fuel and air flow to output a desired heat delivery value.

For embodiments using shorter lengths of Kanthal wire, heating voltage and/or heating time can be reduced. For embodiments using longer lengths of Kanthal wire, voltage and/or time can be increased above 90 V and 45 seconds.

Referring again to FIG. 10, the heating apparatus 902 can be operable as a start-up apparatus. The start-up apparatus can include a start-up flame holder 1002 configured to temporarily hold a start-up flame disposed to output heat to the perforated reaction holder 102. The start-up flame holder 1002 can include a bluff body configured to cause vortices to circulate heat to maintain the start-up flame 1004. The start-up flame holder 1002 can be configured to be mechanically retracted to a position that does not hold the start-up flame 1004 after the perforated reaction holder has reached an operating temperature. Additionally or alternatively, the start-up flame holder 1002 can be configured for manual actuation by a combustion system 900 operator.

The start-up apparatus 902 can further include a flame charger disposed to output charges to the start-up flame 1004. The start-up apparatus 902 can include a conductive body configured to attract the charges from the start-up flame 1004 to hold the start-up flame 1004 for outputting heat to the perforated reaction holder 102.

Referring to FIGS. 9A and 9B, the heating apparatus 902 can be a start-up apparatus. Other forms of start-up apparatuses 902 are contemplated. For example, the start-up apparatus 902 can include an electrical discharge igniter configured to output a pulsed ignition to the air and fuel. Additionally or alternatively, the start-up apparatus 902 can include a pilot flame apparatus disposed to ignite a fuel and air mixture 112 entering the perforated reaction holder 102. The electrical discharge igniter and/or pilot flame apparatus can be operatively coupled to an electronic controller configured to cause the electrical discharge igniter or pilot flame apparatus to maintain combustion of the air and fuel mixture 112 in the perforated reaction holder 102 before the perforated reaction holder 102 is heated sufficiently to maintain combustion. The start-up apparatus 902 can additionally or alternatively include a pilot flame apparatus.

EXAMPLES

Figure 12:
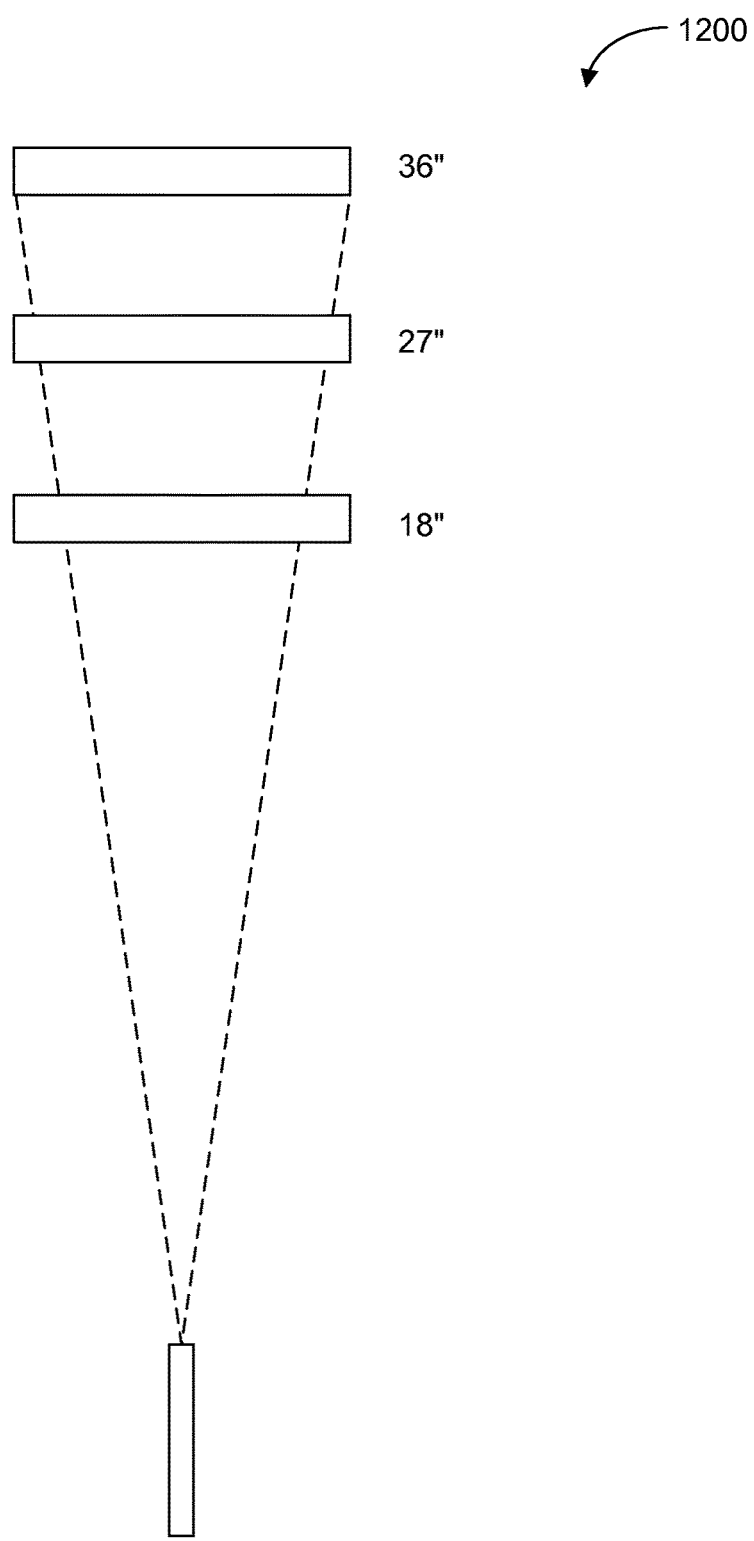
FIG. 12 is a diagram of an experimental apparatus used to determine the effect of dilution distance between a fuel nozzle and a perforated reaction holder, according to an embodiment.
Figure 13:
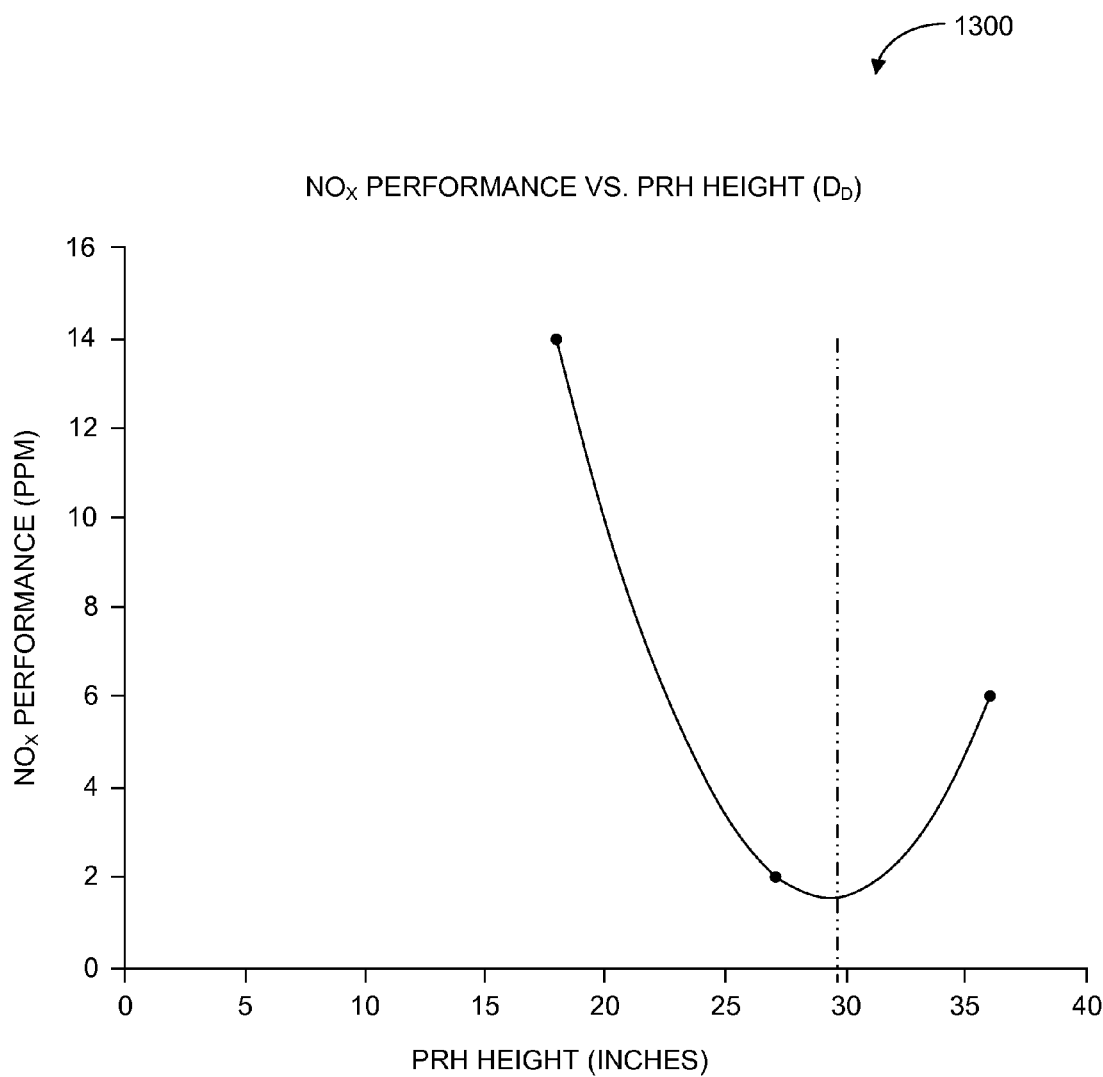
FIG. 13 is a plot of measured and predicted NOx output determined using the apparatus shown in FIG. 12.

FIG. 12 is a diagram of an experimental apparatus 1200 used to determine the effect of dilution distance between a fuel nozzle and a perforated reaction holder, according to an embodiment. In the experimental apparatus, test firings were conducted with the following conditions:

The fuel was methane.

Fuel pressure varied but was about 12 psig throughout.

Fuel nozzle (pinhole) diameter was 0.11".

A damper in the exhaust flue was 'closed' with about a ¼" gap all the way around the damper. The stack size was about 12" square. The ¼" gap caused the exhaust flue damper to never completely close.

The air source (inlet air) was natural draft and was confined to a 3" hole arranged concentric to a fuel nozzle pipe that occluded about the center ¼" of the 3" hole.

NOx comparisons were made at 3% $O_2$ in the stack.

The perforated reaction holder was 4" total thickness (L dimension). The 4" total thickness was formed as a 2" thick honeycomb bottom layer (VERSAGRID ceramic honeycomb, available from Applied Ceramics, Inc. of Doraville, S.C.) having 16 cells per square inch plus a 2" honeycomb (VERSAGRID) top layer having 64 cells per square inch.

Table 2 gives measured NOx output for each of three dilution distances.

TABLE 2

NOx Output as a Function of Dilution Distance

| PFH Height | Fuel/Air Velocity | NOx Result |
|---|---|---|
| 18" | 19 ft/sec | 14 ppm |
| 27" | 15 ft/sec | 2 ppm |
| 36" | 12 ft/sec | 6 ppm |

FIG. 10 is a plot of measured and predicted [NOx] output determined using the apparatus shown in FIG. 9A. The measured results are also shown in TABLE 2. From inspection of FIG. 10 one can see the lowest measured [NOx] occurred at 27" (245 nozzle diameters). A polynomial best fit of the measured data predicts lowest [NOx] at about 29.2" (265 nozzle diameters).

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A burner system, comprising:
    a fuel and oxidant source disposed to output fuel and oxidant into a combustion volume to form a fuel and oxidant mixture; and
    a perforated reaction holder disposed in the combustion volume, the perforated reaction holder including a perforated reaction holder body defining a plurality of perforations aligned to receive the fuel and oxidant mixture from the fuel and oxidant source;
    wherein the perforations are configured to collectively hold a combustion reaction supported by the fuel and oxidant mixture;
    wherein the plurality of perforations are each characterized by a transverse dimension D between opposing walls; and
    wherein a length L of each perforation is at least eight times the transverse dimension D of the perforation.

2. The burner system of claim 1, wherein the perforated reaction holder has a width dimension $W_{RH}$ between opposite sides of the peripheral surface at least one of: two times, three times, six times, and nine times, a thickness dimension $T_{RH}$ between the input surface and the output surface.

3. A burner system, comprising:
    a fuel and oxidant source disposed to output fuel and oxidant into a combustion volume to form a fuel and oxidant mixture; and
    a perforated reaction holder disposed in the combustion volume, the perforated reaction holder including a perforated reaction holder body defining a plurality of perforations aligned to receive the fuel and oxidant mixture from the fuel and oxidant source;
    wherein the perforations are configured to collectively hold a combustion reaction supported by the fuel and oxidant mixture; and
    further comprising a fuel nozzle configured to output fuel, wherein the fuel nozzle is configured to emit the fuel through a fuel orifice having a dimension $D_O$; and
    wherein the perforated reaction holder is disposed to receive the fuel and oxidant mixture at a distance $D_D$ away from the fuel nozzle greater than 20 times the fuel orifice dimension $D_O$.

4. The burner system of claim 1, wherein the perforated reaction holder body is configured to convey heat between adjacent perforations; and
    wherein the heat conveyed between adjacent perforations is selected to cause heat output from the combustion reaction portion in a perforation to supply heat to stabilize a combustion reaction portion in an adjacent perforation.

5. The burner system of claim 1,
    wherein a length L of each perforation is at least one of: eight times, twelve times, sixteen times, and twenty-four times, the transverse dimension D of the perforation.

6. The burner system of claim 1, wherein the length L is sufficiently long for thermal boundary layers formed adjacent to the walls in a reaction fluid flowing through the perforations to converge within the perforations.

7. The burner system of claim 1, wherein the perforations each have a lateral dimension D equal to or greater than a quenching distance of the fuel.

8. The burner system of claim 1, wherein the perforations are non-parallel to one another.

9. The burner system of claim 1, wherein the perforations are non-parallel to one another and non-intersecting.

10. The burner system of claim 1, wherein the perforations are formed at an angle relative to an input surface and an output surface of the perforated reaction holder.

11. The burner system of claim 1, wherein the perforations are respectively formed at an angle relative to an input and an output surface of the perforated reaction holder; and
wherein the perforations are collectively angled to produce a streamwise vortex in combustion fluid exiting from the perforated reaction holder.

12. The burner system of claim 1, wherein the perforated reaction holder body is configured to receive heat from the fuel combustion reaction and output radiated heat energy to maintain a temperature of the perforated reaction holder body below an adiabatic flame temperature of the fuel combustion reaction.

13. The burner system of claim 1, wherein the plurality of perforations comprise a plurality of elongated squares.

14. A burner system, comprising:
a fuel and oxidant source disposed to output fuel and oxidant into a combustion volume to form a fuel and oxidant mixture; and
a perforated reaction holder disposed in the combustion volume, the perforated reaction holder including a perforated reaction holder body defining a plurality of perforations aligned to receive the fuel and oxidant mixture from the fuel and oxidant source;
wherein the perforations are configured to collectively hold a combustion reaction supported by the fuel and oxidant mixture;
wherein the plurality of perforations are substantially normal to input and output surfaces of the perforated reaction holder, and
wherein the perforated reaction holder body defines a central aperture, a first set of apertures in a concentric arrangement relative to the central aperture having a selected spacing and size, and a second set of apertures in concentric arrangement relative to the central aperture having a different selected spacing and size; and
wherein the perforated reaction holder is configured to hold the fuel combustion reaction.

15. A burner system, comprising:
a fuel and oxidant source disposed to output fuel and oxidant into a combustion volume to form a fuel and oxidant mixture; and
a perforated reaction holder disposed in the combustion volume, the perforated reaction holder including a perforated reaction holder body defining a plurality of perforations aligned to receive the fuel and oxidant mixture from the fuel and oxidant source;
wherein the perforations are configured to collectively hold a combustion reaction supported by the fuel and oxidant mixture;
wherein the perforated flame holder body comprises fibers;
wherein the fibers comprise reticulated fibers; and
wherein the fibers define branching perforations that weave around and through the fibers.

16. A burner system, comprising:
a fuel and oxidant source disposed to output fuel and oxidant into a combustion volume to form a fuel and oxidant mixture; and
a perforated reaction holder disposed in the combustion volume, the perforated reaction holder including a perforated reaction holder body defining a plurality of perforations aligned to receive the fuel and oxidant mixture from the fuel and oxidant source;
wherein the perforations are configured to collectively hold a combustion reaction supported by the fuel and oxidant mixture;
wherein the perforated reaction holder body is continuous; and
wherein the perforated reaction holder body defines perforations that branch from one another.

17. A burner system, comprising:
a fuel and oxidant source disposed to output fuel and oxidant into a combustion volume to form a fuel and oxidant mixture; and
a perforated reaction holder disposed in the combustion volume, the perforated reaction holder including a perforated reaction holder body defining a plurality of perforations aligned to receive the fuel and oxidant mixture from the fuel and oxidant source;
wherein the perforations are configured to collectively hold a combustion reaction supported by the fuel and oxidant mixture;
wherein the perforated reaction holder body comprises a plurality of pillars; and
wherein the plurality of perforations comprise spaces between the plurality of pillars.

18. The burner system of claim 17, further comprising:
a base plate operatively coupled to the plurality of pillars, and
wherein the base plate defines a plurality of apertures configured to allow oxidation fluid to flow into the perforations between the pillars.

19. The burner system of claim 18, wherein the base plate comprises a perforated metal sheet including openings selected to allow oxidation fluid to flow into the perforations between the pillars.

20. A burner system, comprising:
a fuel and oxidant source disposed to output fuel and oxidant into a combustion volume to form a fuel and oxidant mixture; and
a perforated reaction holder disposed in the combustion volume, the perforated reaction holder including a perforated reaction holder body defining a plurality of perforations aligned to receive the fuel and oxidant mixture from the fuel and oxidant source;
wherein the perforations are configured to collectively hold a combustion reaction supported by the fuel and oxidant mixture; and
wherein the perforated reaction holder body comprises a plurality of tubes bundled together, and wherein the plurality of perforations comprise hollow cylinders inside the plurality of tubes.

21. A burner system, comprising:
a fuel and oxidant source disposed to output fuel and oxidant into a combustion volume to form a fuel and oxidant mixture; and
a perforated reaction holder disposed in the combustion volume, the perforated reaction holder including a perforated reaction holder body defining a plurality of perforations aligned to receive the fuel and oxidant mixture from the fuel and oxidant source;
wherein the perforations are configured to collectively hold a combustion reaction supported by the fuel and oxidant mixture; and
wherein the perforated reaction holder body comprises a plurality of tubes bundled together, and wherein the plurality of perforations comprise interstitial spaces between the bundled tubes.

22. The burner system of claim 20,
wherein the plurality of tubes comprise ceramic tubes; and
further comprising a refractory cement between the tubes and configured to adhere the tubes together.

23. A burner system, comprising:
a fuel and oxidant source disposed to output fuel and oxidant into a combustion volume to form a fuel and oxidant mixture; and
a perforated reaction holder disposed in the combustion volume, the perforated reaction holder including a perforated reaction holder body defining a plurality of perforations aligned to receive the fuel and oxidant mixture from the fuel and oxidant source;
wherein the perforations are configured to collectively hold a combustion reaction supported by the fuel and oxidant mixture;
wherein the perforated reaction holder body comprises discontinuous packing bodies;
wherein the perforations comprise interstitial spaces between the discontinuous packing bodies; and
wherein the discontinuous packing bodies comprise structured packing shapes.

24. The burner system of claim 23, wherein the discontinuous packing bodies comprise ceramic Raschig rings, balls, or saddles.

25. The burner system of claim 23, wherein the perforated reaction holder further comprises a metal cage configured to hold the packing bodies.

26. A furnace, comprising:
a fuel and air source disposed to output fuel and air into a combustion volume to form a fuel and air mixture;
a perforated reaction holder disposed in the combustion volume, the perforated reaction holder including a perforated reaction holder body defining a plurality of perforations aligned to receive the fuel and air mixture from the fuel and air source; and
a perforated reaction holder support structure configured to support the perforated reaction holder at a distance $D_D$ from the fuel and air source;
wherein the perforations are configured to collectively hold a major portion of a combustion reaction supported by the fuel and air mixture; and
wherein holding the major portion of the combustion reaction comprises supporting combustion such that visible flame extension from an output surface of the perforated flame holder away from the fuel and air source is less in distance than three times a thickness $T_{RH}$ of the perforated reaction holder.

27. A furnace, comprising:
a fuel and air source disposed to output fuel and air into a combustion volume to form a fuel and air mixture;
a perforated reaction holder disposed in the combustion volume, the perforated reaction holder including a perforated reaction holder body defining a plurality of perforations aligned to receive the fuel and air mixture from the fuel and air source; and
a perforated reaction holder support structure configured to support the perforated reaction holder at a distance $D_D$ from the fuel and air source;
wherein the fuel and air source further comprises:
a fuel nozzle configured to output fuel toward the perforated reaction holder through an orifice having a diameter; and
an air source configured to output air carrying oxygen into the combustion volume;
wherein the fuel and air respectively from the fuel and air sources mix to form the fuel and air mixture as the fuel and air pass through a distance $D_D$ between the fuel and air source and the perforated reaction holder.

28. A furnace, comprising:
a fuel and air source disposed to output fuel and air into a combustion volume to form a fuel and air mixture;
a perforated reaction holder disposed in the combustion volume, the perforated reaction holder including a perforated reaction holder body defining a plurality of perforations aligned to receive the fuel and air mixture from the fuel and air source; and
a perforated reaction holder support structure configured to support the perforated reaction holder at a distance $D_D$ from the fuel and air source;
wherein a fuel and air mixture output by the fuel and air source is selected to provide a fuel dilution that causes the combustion reaction to be unstable without support by the perforated reaction holder.

29. The furnace of claim 28, wherein a region between the peripheral wall of the perforated reaction holder and the walls of the combustion volume is selected to allow natural circulation of flue gas from a region of the combustion volume distal from a region between the fuel and air source and the perforated reaction holder to a region of the combustion volume between the fuel and air source and the perforated reaction holder.

30. The furnace of claim 27, further comprising a furnace floor defined by a furnace body;
wherein the support structure is configured to support the perforated reaction holder from the combustion volume floor.

31. The furnace of claim 27, further comprising:
a furnace body defining furnace walls, the furnace walls comprising a nonmetallic refractory material; and
a plurality of radiant section working fluid tubes disposed between the perforated reaction holder peripheral surface and the furnace walls;
wherein the perforated reaction holder is configured to emit thermal radiation to heat the plurality of radiant section working fluid tubes and the furnace walls.

32. The furnace of claim 27, wherein the fuel and air source comprises swirl vanes, the swirl vanes being disposed to aid fuel and air mixing without providing sufficient mixing to cause the combustion reaction to be supported by the fuel and air source.

33. A furnace, comprising:
a fuel and air source disposed to output fuel and air into a combustion volume to form a fuel and air mixture;
a perforated reaction holder disposed in the combustion volume, the perforated reaction holder including a perforated reaction holder body defining a plurality of perforations aligned to receive the fuel and air mixture from the fuel and air source;
a perforated reaction holder support structure configured to support the perforated reaction holder at a distance $D_D$ from the fuel and air source; and
a furnace body defining furnace walls;
wherein the perforated reaction holder support structure is supported from the furnace walls.

34. The furnace of claim 33, wherein the perforated reaction holder support structure defines apertures selected to allow natural circulation of flue gas from a region of the combustion volume distal from a region between the fuel and air source and the perforated reaction holder to a region of the combustion volume between the fuel and air source and the perforated reaction holder.

35. A combustion system, comprising:
a fuel and oxidant source configured to output fuel and oxidant as a fuel and oxidant mixture;
a perforated reaction holder aligned to receive the fuel and oxidant mixture across an input surface including a plurality of perforations; and
a heating apparatus configured to cause heating of the perforated reaction holder;
a control circuit operatively coupled to the heating apparatus, the control circuit being configured to cause the heating apparatus to operate;
a combustion sensor operatively coupled to the control circuit, the combustion sensor being configured to detect a temperature of the perforated reaction holder; and
a fuel control valve configured to control a flow of fuel from a fuel source to the fuel and oxidant source, the fuel control valve being operatively coupled to the control circuit;
wherein the control circuit is configured to control the fuel control valve responsive to input from the combustion sensor; and
wherein the control circuit is configured to support a combustion reaction supported by the fuel and oxidant mixture in the plurality of perforations after the heating apparatus preheats the perforated reaction holder.

36. The combustion system of claim 35, wherein the control circuit is configured to control the heating apparatus to heat the perforated reaction holder to an operating temperature prior to controlling the fuel control valve to cause output of the fuel and oxidant mixture to the perforated reaction holder.

37. The combustion system of claim 35, further comprising:
an oxygen sensor disposed to detect oxygen concentration in an exhaust flue and operatively coupled to the control circuit.

38. The combustion system of claim 35, wherein the heating apparatus comprises:
a flame holder configured to support a flame disposed to heat the perforated reaction holder; and
wherein the fuel and oxidant source includes a fuel nozzle configured to emit a fuel stream; and
an air source configured to output combustion air adjacent to the fuel stream;
wherein the fuel nozzle and air source are configured to output the fuel stream to be progressively diluted by the combustion air; and
wherein the perforated reaction holder is disposed to receive a diluted fuel and air mixture that supports a lean combustion reaction that is stabilized by the perforated reaction holder when the perforated reaction holder is at an operating temperature; and
wherein the flame holder is configured to support the flame at a location corresponding to a rich fuel and air mixture that is stable without stabilization provided by the heated perforated reaction holder.

39. The combustion system of claim 35, wherein the heating apparatus comprises an electrical resistance heater operatively coupled to the perforated reaction holder.

40. The combustion system of claim 39, wherein the electrical resistance heater is configured to heat the perforated reaction holder to prevent the perforated reaction holder falling below an operating temperature.

41. The combustion system of claim 35, wherein the heating apparatus is operable as a start-up apparatus,
wherein the start-up apparatus includes a start-up flame holder configured to temporarily hold a start-up flame disposed to output heat to the perforated reaction holder.

42. The combustion system of claim 41, wherein the start-up flame holder includes a bluff body configured to cause vortices to circulate heat to maintain the start-up flame.

43. The combustion system of claim 41, wherein the start-up flame holder is configured to be mechanically retracted to a position that does not hold the start-up flame after the perforated reaction holder has reached an operating temperature.

44. The combustion system of claim 41, further comprising a flame charger disposed to output charges to the start-up flame;
wherein the start-up apparatus includes a conductive body configured to attract the charges from the start-up flame to hold the start-up flame for outputting heat to the perforated reaction holder.

45. The combustion system of claim 35, wherein the heating apparatus includes an electrical discharge igniter configured to output a pulsed ignition to the fuel and oxidant mixture.

46. The combustion system of claim 35, wherein the heating apparatus includes a pilot flame apparatus.

47. The burner system of claim 1, wherein the length L is at least twelve times the transverse dimension D.

48. The burner system of claim 1, wherein the length L is at least sixteen times the transverse dimension D.

49. The burner system of claim 1, wherein the length L is at least twenty-four times the transverse dimension D.

50. The burner system of claim 3, wherein the perforated reaction holder is disposed to receive the fuel and oxidant mixture at a distance $D_D$ away from the fuel nozzle greater than or equal to 100 times the fuel orifice dimension $D_O$.

51. The burner system of claim 50, wherein the perforated reaction holder is disposed to receive the fuel and oxidant mixture at a distance $D_D$ away from the fuel nozzle greater than or equal to 245 times the fuel orifice dimension $D_O$.

52. The burner system of claim 16, wherein the perforations maintain a combustion reaction of a leaner mixture of fuel and oxidant than it is possible to combust outside of the perforations.

53. The furnace of claim 26, wherein holding the major portion of the combustion reaction comprises supporting combustion such that visible flame extension from an input surface of the perforated flame holder toward the fuel and air source is less in distance than a thickness $T_{RH}$ of the perforated reaction holder.

54. The furnace of claim 26, wherein the perforations are configured to collectively hold a major portion of a combustion reaction supported by the fuel and air mixture.

* * * * *